(12) United States Patent
Greenwalt et al.

(10) Patent No.: US 7,127,527 B1
(45) Date of Patent: Oct. 24, 2006

(54) NETWORK ELEMENT TERMINAL DATA INTERFACE SYSTEM AND METHOD

(75) Inventors: Amber D. Greenwalt, Plano, TX (US); Randy J. Ellis, Carrollton, TX (US); Adam S. Benz, Dallas, TX (US); Robert G. Utterback, Rowlett, TX (US); Christopher D. Atkins, Richardson, TX (US); Deborah L. Maznaritz, Garland, TX (US); Timothy P. Brown, Frisco, TX (US); Zhejing Luo, Plano, TX (US); Bryan J. McGlade, Balwyn North (AU)

(73) Assignee: Alcatel, Paris (FR)

( * ) Notice: Subject to any disclaimer, the term of this patent is extended or adjusted under 35 U.S.C. 154(b) by 832 days.

(21) Appl. No.: 10/028,076

(22) Filed: Dec. 21, 2001

(51) Int. Cl.
*G06F 15/16* (2006.01)

(52) U.S. Cl. ................... 709/249; 709/246; 709/203

(58) Field of Classification Search ........... 709/232, 709/246, 249; 717/171
See application file for complete search history.

(56) References Cited

U.S. PATENT DOCUMENTS

| | | | | |
|---|---|---|---|---|
| 4,648,062 | A * | 3/1987 | Johnson et al. | 715/708 |
| 5,121,497 | A * | 6/1992 | Kerr et al. | 719/328 |
| 5,255,386 | A * | 10/1993 | Prager | 707/5 |
| 5,513,308 | A * | 4/1996 | Mori | 715/707 |
| 5,644,735 | A * | 7/1997 | Luciw et al. | 715/708 |
| 5,798,757 | A * | 8/1998 | Smith | 715/709 |
| 5,825,355 | A * | 10/1998 | Palmer et al. | 715/712 |
| 5,859,637 | A * | 1/1999 | Tidwell, II | 715/708 |
| 6,005,569 | A * | 12/1999 | Breggin | 715/711 |
| 6,046,741 | A * | 4/2000 | Hochmuth | 715/704 |
| 6,098,061 | A * | 8/2000 | Gotoh et al. | 706/50 |
| 6,208,338 | B1 * | 3/2001 | Fischer et al. | 715/705 |
| 6,233,726 | B1 * | 5/2001 | Bowman et al. | 717/107 |
| 6,340,977 | B1 * | 1/2002 | Lui et al. | 715/709 |
| 6,502,234 | B1 * | 12/2002 | Gauthier et al. | 717/107 |
| 6,542,607 | B1 * | 4/2003 | Euchner et al. | 380/37 |
| 6,625,590 | B1 * | 9/2003 | Chen et al. | 707/1 |
| 6,687,485 | B1 * | 2/2004 | Hopkins et al. | 434/350 |
| 6,748,580 | B1 * | 6/2004 | Sur et al. | 717/105 |

OTHER PUBLICATIONS

Lumos TL1 Agent (product documentation), http://www.lumos.com/products_tl1agent.html [5 pages].

* cited by examiner

*Primary Examiner*—Andrew Caldwell
*Assistant Examiner*—Stephan Willett
(74) *Attorney, Agent, or Firm*—Jessica W. Smith; V. Lawrence Sewell

(57) ABSTRACT

A NETWORK ELEMENT TERMINAL DATA INTERFACE (NETDI) system and method incorporating a terminal user interface which permits manipulation of network elements using a hardware-specific control language is disclosed. The present invention teaches automatic generation of on-line help directly from I/O manual specifications and translation of operator commands into network element specific protocols via the use of a network element database and associated XML repository. Various preferred embodiments of the present invention incorporate the use of TL1 composer/parsers to permit the automatic generation of Translation Language 1 interfaces between an operator console and a wide variety of telecommunication network elements. The present invention operates over a wide variety of communication media and permits a significant reduction of software maintenance with respect to on-line help generation directly from I/O manual specifications as well as automated incorporation of new network element features into existing operator console environmental controls, resulting in a drastic reduction in the required network element control language proficiency of network operators in any given telecommunications environment.

8 Claims, 24 Drawing Sheets

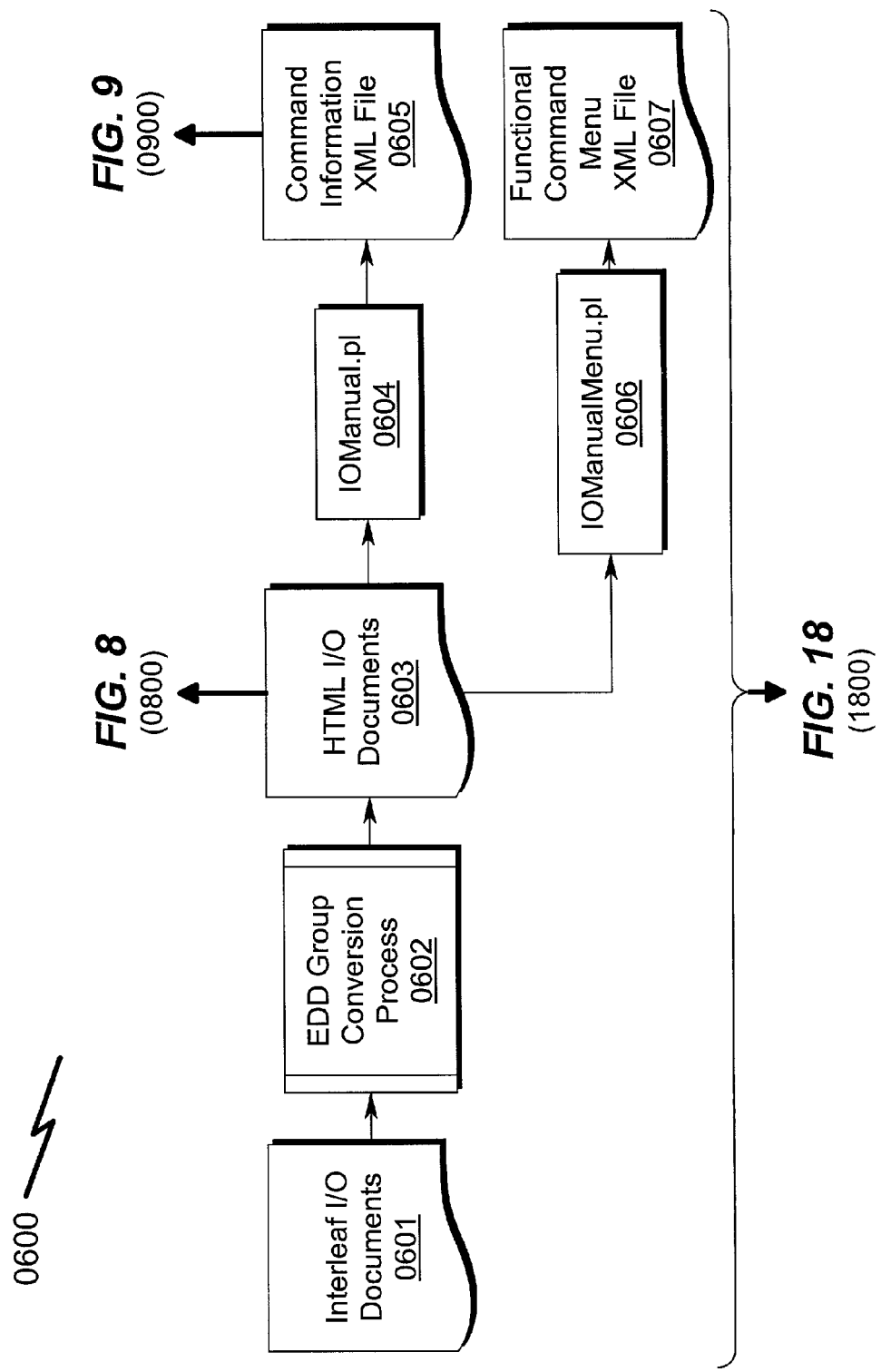

FIG. 7

```
                                    0700
<HTML>
  <BODY BGCOLOR="#FFFFFF">
    <H2> COMMAND CODE: CHG-TL-DIG </H2>
    <H2> COMMAND NAME: CHANGE TERMINATE-AND-LEAVE DIGITAL </H2>
    <H3> INPUT FORMAT </H3>
    <P ALIGN="LEFT">
      <CODE> CHG-TL-DIG:[TID]:TAP:[CTAG]::ACT;</CODE>
    </P>
    <H3> INPUT PARAMETERS </H3>
    <DL>
      <DT> <A NAME="TID"> TID </DT>
      <DD> < 1-20 VALID TID CHARACTERS > </DD>
      <DL>
          <DT>  <STRONG>Default:</STRONG>   </DT>
          <DD> <SID> </DD>
          <DT> <STRONG>Addressing:</STRONG> </DT>
          <DD> None </DD>
          <DT> <STRONG>Description:</STRONG> </DT>
          <DD> Target Identifier.  </DD>
      </DL>
      <DT> <A NAME="TAP"> TAP </DT>
      <DD> < DS1, DS3, STS1 or VC1 AID > </DD>
      <DL>
          <DT>  <STRONG>Default:</STRONG>   </DT>
          <DD> Entry Required </DD>
          <DT> <STRONG>Addressing:</STRONG> </DT>
          <DD> None </DD>
          <DT> <STRONG>Description:</STRONG> </DT>
          <DD> Test Access Port AID.  </DD>
      </DL>
      <DT> <A NAME="CTAG"> CTAG </DT>
      <DD> < 1-6 VALID CTAG CHARACTERS > </DD>
      <DL>
          <DT>  <STRONG>Default:</STRONG>   </DT>
          <DD> < System assigned CTAG value > </DD>
          <DT> <STRONG>Addressing:</STRONG> </DT>
          <DD> None </DD>
          <DT> <STRONG>Description:</STRONG> </DT>
          <DD> Correlation Tag.  </DD>
      </DL>
      <DT> <A NAME="ACT"> ACT </DT>
      <DD> {RLSA, RLSAB, RLSB, TERMA, TERMAB, TERMB} </DD>
      <DL>
          <DT>  <STRONG>Default:</STRONG>   </DT>
          <DD> Entry Required </DD>
          <DT> <STRONG>Addressing:</STRONG> </DT>
          <DD> None </DD>
          <DT> <STRONG>Description:</STRONG> </DT>
          <DD> Action, specifies the terminate-and-leave action.</DD>
      </DL>
    </DL>
  </BODY>
</HTML>
```

<template file="C027.HTM">
<command name="CHG-TL-DIG" numblk="5">
   <cmd.syntax><![CDATA[CHG-TL-DIG:[TID]:TAP:[CTAG]::ACT;]]></cmd.syntax>
   <cmd.desc>CHANGE TERMINATE-AND-LEAVE DIGITAL</cmd.desc>
   <block numparm="1">
      <parm>
         <parm.name>TID</parm.name>
         <parm.desc>Target Identifier.</parm.desc>
         <hint><![CDATA[1-20 VALID TID CHARACTERS]]></hint>
         <default><![CDATA[SID]]></default>
      </parm>
   </block>
   <block numparm="1">
      <parm type="required">
         <parm.name>TAP</parm.name>
         <parm.desc>Test Access Port AID.</parm.desc>
         <hint><![CDATA[DS1, DS3, STS1 or VC1 AID]]></hint>
         <default><![CDATA[Entry Required]]></default>
      </parm>
   </block>
   <block numparm="1">
      <parm>
         <parm.name>CTAG</parm.name>
         <parm.desc>Correlation Tag.</parm.desc>
         <hint><![CDATA[1-6 VALID CTAG CHARACTERS]]></hint>
         <default><![CDATA[System assigned CTAG value]]></default>
      </parm>
   </block>
   <block numparm="0"/>
   <block numparm="1">
      <parm type="required">
         <parm.name>ACT</parm.name>
         <parm.desc>Action</parm.desc>
         <hint><![CDATA[See list.]]></hint>
         <default><![CDATA[Entry Required]]></default>
         <numval>6</numval>
         <value><![CDATA[RLSA]]></value>
         <value><![CDATA[RLSAB]]></value>
         <value><![CDATA[RLSB]]></value>
         <value><![CDATA[TERMA]]></value>
         <value><![CDATA[TERMAB]]></value>
         <value><![CDATA[TERMB]]></value>
      </parm>
   </block>
</command>
</template>
```

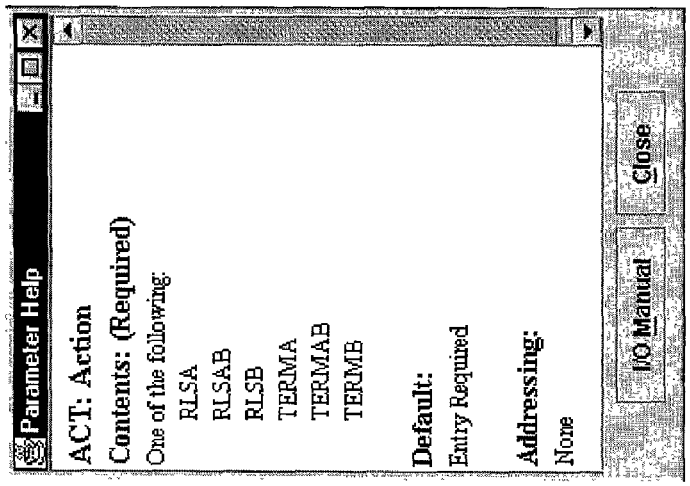
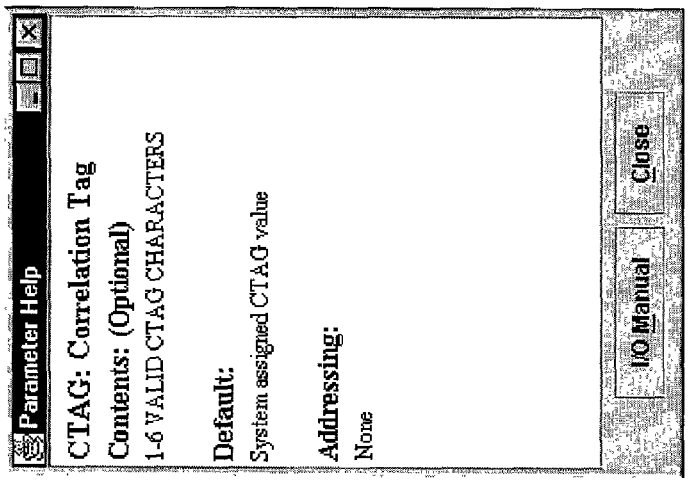
FIG. 14

<!DOCTYPE tl1templates [
   <!ELEMENT tl1templates
             (product, stream, release, (template)*)>
   <!ELEMENT product (#PCDATA)>
   <!ELEMENT stream  (#PCDATA)>
   <!ELEMENT release (#PCDATA)>
   <!ELEMENT template (command, response?)>
   <!ATTLIST template
      file     CDATA    #REQUIRED
   >
   <!ELEMENT command (cmd.syntax,
                      cmd.desc,
                      block+)>
   <!ATTLIST command
      name     CDATA    #REQUIRED
      numblk   CDATA    #REQUIRED
   >
   <!ELEMENT cmd.syntax (#PCDATA)>
   <!ELEMENT cmd.desc (#PCDATA)>
   <!ELEMENT block (parm*)>
   <!ATTLIST block
      numparm CDATA    #REQUIRED
      keywrd   (y | n)  "n"
   >
   <!ELEMENT parm (parm.name?, parm.desc?,
                   hint?, default?, numval?,
                   value*)>
   <!ATTLIST parm
      type     (optional | required) "optional"
      ranges   (y | n)  "n"
      groups   (y | n)  "n"
      masked   (y | n)  "n"
   >
   <!ELEMENT parm.name  (#PCDATA)>
   <!ELEMENT parm.desc  (#PCDATA)>
   <!ELEMENT hint       (#PCDATA)>
   <!ELEMENT default    (#PCDATA)>
   <!ELEMENT numval     (#PCDATA)>
   <!ELEMENT value      (#PCDATA)>
   <!ELEMENT response   (#PCDATA)>
]>
```

<!DOCTYPE t11menuhierarchy [
    <!ELEMENT t11menuhierarchy
          (product, stream, release, (t11menu)+)>
    <!ELEMENT product  (#PCDATA)>
    <!ELEMENT stream   (#PCDATA)>
    <!ELEMENT release  (#PCDATA)>
    <!ELEMENT t11menu  (t11menu | item)+ >
    <!ATTLIST t11menu
              title     CDATA    #REQUIRED
              open      CDATA    #IMPLIED
    >
    <!ELEMENT item (#PCDATA) >
    <!ATTLIST item
              desc      CDATA    #REQUIRED
    >
]>
```

NETWORK ELEMENT TERMINAL DATA INTERFACE SYSTEM AND METHOD

CROSS REFERENCE TO RELATED APPLICATIONS

Not Applicable

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention is related to the general area of distributed Element Management Systems (EMS) that are utilized to control network elements (NEs) in a telecommunications network. While the scope of the present invention is wider than application to telecommunication systems, the present invention has particular application to this network model.

BACKGROUND AND DESCRIPTION OF THE PRIOR ART

Overview (0100)

Referring to FIG. 1 (0100), within the context of modern telecommunications networks it is often necessary for operators (0111) to interface with one or more computer systems (0112) having element manger software (0113) embodied on a variety of media (0114, 0115) to communicate across a distributed network (0121) to control a variety of network element (NE) (0131, 0132) telecommunication devices such as switches, routers, and the like.

Within this environment, it is often necessary to add additional network elements into the network. This requires the ability to add new network elements to the element manager and upgrade the element managers in response to changes in the network elements as well as support software bug fixes, etc. Additionally, operators and customers in this environment would prefer the use of a generalized craft interface to permit communication with the network elements using a generalized hardware language such as TL1 (Transaction Language 1) or some other general purpose hardware command/control language.

Best Existing Solutions

The prior art teaches that the best solution to this operator communication interface is one in which the I/O manuals (0141) for a particular network element are converted by a "toolkit" (0142) to create an "adapter" database (0143). This adapter database (0143) is then installed on the customer's terminal/PC (0112) to interface with the element manager (0113). When new network elements (0131, 0132) are to be added or software updated in this configuration, it is particularly difficult for the customer (0111) to upgrade the adapter. This upgrade generally required the equipment vendor (0151) to send a new adapter database (0143) to the customer.

Prior Art System Deficiencies (0100)

The difficulty in this architecture (0100) is in the logistical problems associated with updating the adapter database (0143). This database update must be done by the equipment vendor (0151) and sent to the customer as a new adapter database (0143). In addition, the TL1 command interfaces supported by the network elements (0131, 0132) required that the customer be very proficient and knowledgeable in the TL1 command language to communicate with the range of network elements (0131, 0132) supported by the network.

Prior Art Method Deficiencies (0200)

Associated with the prior art system illustrated in FIG. 1 (0100) and its associated deficiencies is the prior art operator help/interface method of FIG. 2 (0200). The prior art teaches that a generalized operator interface having a help interface must first start with the generation of vendor-specific network element I/O manuals (0201). These are then converted to an adapter database via a toolkit supplied by the vendor (0202). This adapter database is then released to the customer (0203), who then installs the adapter database on the customer terminal/PC (0204). The operator must then manually enter network element commands using some command language (TL1, etc.) (0205) with essentially no automated help or prompting from the system. This requires a proficiency in the network element command language that is beyond the capability of many operators. Finally, as the network elements are updated, changes to the system (0206) require that the entire process be repeated, resulting in a significant software maintenance burden for both the vendor and the customer/operator.

Additionally, the prior art generally taught the requirement for a unique command conversion method for a group of NE types, or alternatively the requirement that a human enter the TL1 command structure formats by hand to produce TL1 command information. The present invention circumvents this significant drawback by permitting TL1 information to be extracted directly from HTML text pages if these pages are properly formatted or contain properly tagged embedded data supplied by the I/O manual document preparer.

OBJECTIVES OF THE INVENTION

Accordingly, the objectives of the present invention are (among others) to circumvent the deficiencies in the prior art and affect the following:

(1) To reduce software maintenance overhead associated with maintaining network elements.

(2) To reduce the coupling between network elements and the on-line help systems associated with their deployment.
(3) To automate the integration of on-line help systems with network element command and control functions.
(4) To eliminate the need for network element specific (e.g., TL1) language proficiency by network control operators.
(5) To permit expansion of network element functionality with little or no reeducation of network management personnel.
(6) To permit the automated generation of TL1 command and command structure information directly from HTML text pages or other textual information describing TL1 command syntax.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview (0300)

As illustrated in FIG. 3 (0300), the present invention as embodied in a system comprises a software driven (0301) user interface (0302) that an operator (0303) uses to control a variety of network elements (0304, 0305) via a communications network (0306) under the direction of a TL1 composer/parser (0307). The TL1 composer/parser (0307) processes commands from the user interface (0302).

While there is a part of TL1DAT composer/parser (0307) that takes a full TL1 command and populates all the parameter fields with the appropriate data (a "parser") and another part of the application that takes all the data in the parameter fields to create a full TL1 command (a "composer"), neither of these parts are utilized when sending TL1 commands from a batch/log file (0308). Commands from a batch file (0308) are sent as is by a batch processor (0309) to the network elements (0304, 0305) without any checking or parsing. While batch commands are sent to network elements (0304, 0305) without additional processing in the described preferred embodiment, one skilled in the art will recognize that there may be advantages to having the batch processor (0309) communicate directly with the TL1 composer/parser (0307) to communicate batch commands over the communication network interface (0306) to the network elements (0304, 0305). In this context the TL1 composer/parser (0307) would function more generally as a communication module.

The system as presented (0300) additionally permits administration of automation of on-line help via the integration of HTML network element I/O Manuals (0311) into on-line help subsystems (0312, 0313) that may be dialog-driven or menu-driven and are well known in the art. This administration (0310) function also permits maintenance of an XML repository (0314) and an associated network element database (0315).

The HTML NE I/O Manuals (0311) are actually used, as is, as a type of on-line help for the TL1 commands that can be displayed to the user in a browser by means of a menu command or window button. Additionally, there are also on-line HTML help files for the application itself. The I/O Manual HTML files are also used to create an XML file (0314) that contains all the data about each TL1 command. It is this XML file (0314) that allows the parameter fields to be displayed for a TL1 command (0312), thus providing parameter-specific on-line help.

Method Overview (0400)

The present invention may be embodied as a TL1 Direct Access Terminal (TL1DAT). This application is designed to utilize a TL1 element's I/O manual to provide a user with additional help sending commands to TL1 network elements. An exemplary method implementing this application is described by the flowchart illustrated in FIG. 4 (0400).

In this exemplary application, the connection method, network address, user identifier and password are provided by the user operator (0401). TL1DAT then makes a connection and logs the user on (0402). An NE specific command is used to retrieve the NE type and version (0403). This command may in many cases be "RTRV-PRMTR-NE" or an equivalent NE specific command. TL1DAT then opens and reads the appropriate XML file to create a command tree for this NE (0404).

Once the user selects a command code (0405), TL1DAT obtains all of the command's parameters from the XML file (0406). It then creates an editable field for each parameter in the command (0407). As the user fills in values, the TL1 command will be created (0408). When the user presses the "Send" button, the command is sent to the NE, and written into the command window (0409). Once the response is received, it is displayed in the response window.

BRIEF DESCRIPTION OF THE DRAWINGS

For a fuller understanding of the advantages provided by the invention, reference should be made to the following detailed description together with the accompanying drawings wherein:

FIG. 6 illustrates an exemplary implementation of automated on-line help documentation being incorporated into a terminal data user interface;

FIG. 7 illustrates an exemplary help file in HTML format that might be associated with a given TL1 command interface;

FIG. 8 illustrates an exemplary XML file generated by processing the HTML file in FIG. 7 through a PERL script;

FIG. 14 illustrates exemplary Parameter Help windows that are extracted from XML files and their associated I/O manuals;

FIG. 21 illustrates an exemplary DTD from an autogenerated XML file of typical TL1 commands;

FIG. 22 illustrates an exemplary DTD from an autogenerated XML file of a typical command menu hierarchy;

DESCRIPTION OF THE PRESENTLY PREFERRED EXEMPLARY EMBODIMENTS

Figure 1:
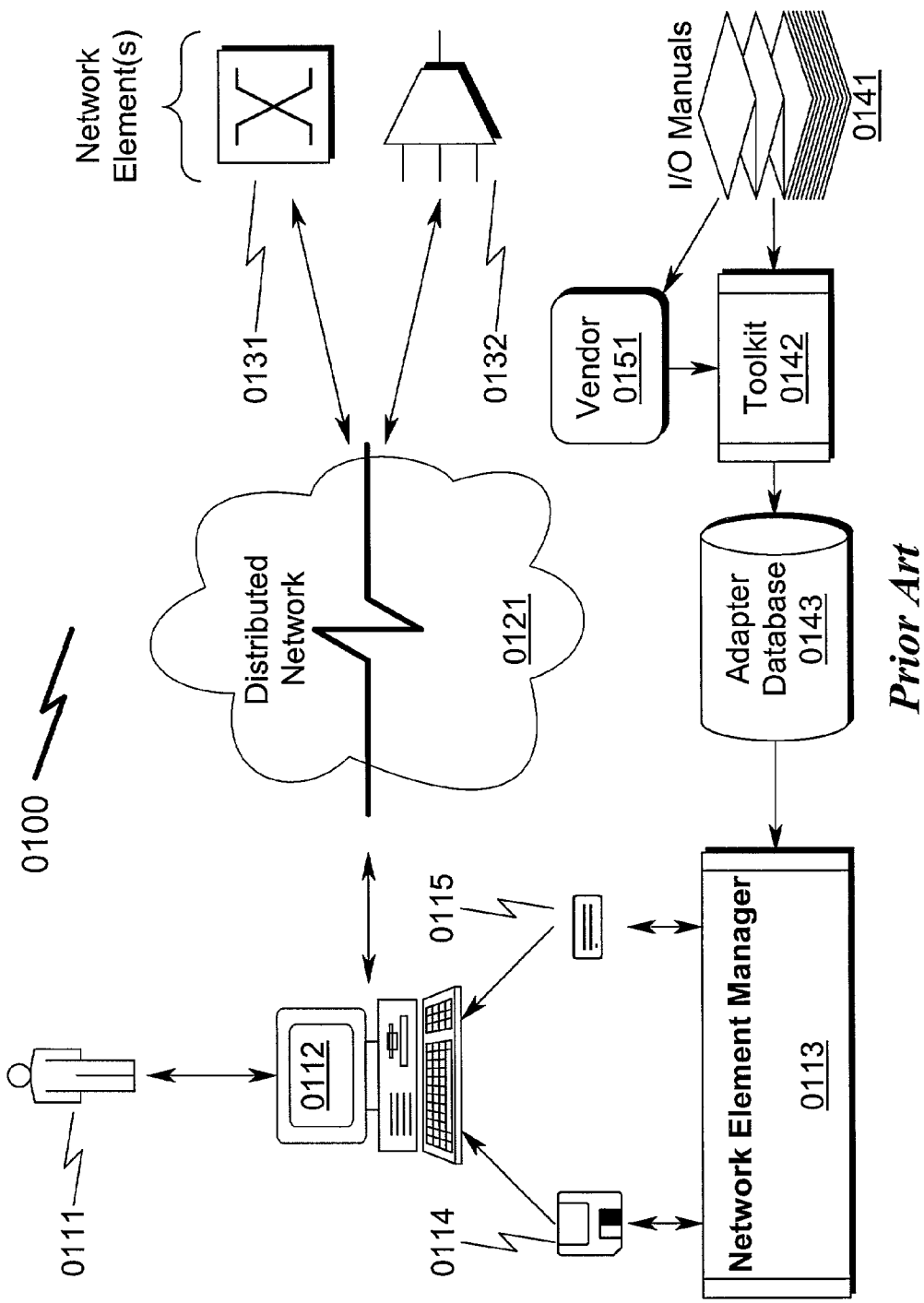
FIG. 1 illustrates a generalized system overview of the prior art.
Figure 2:
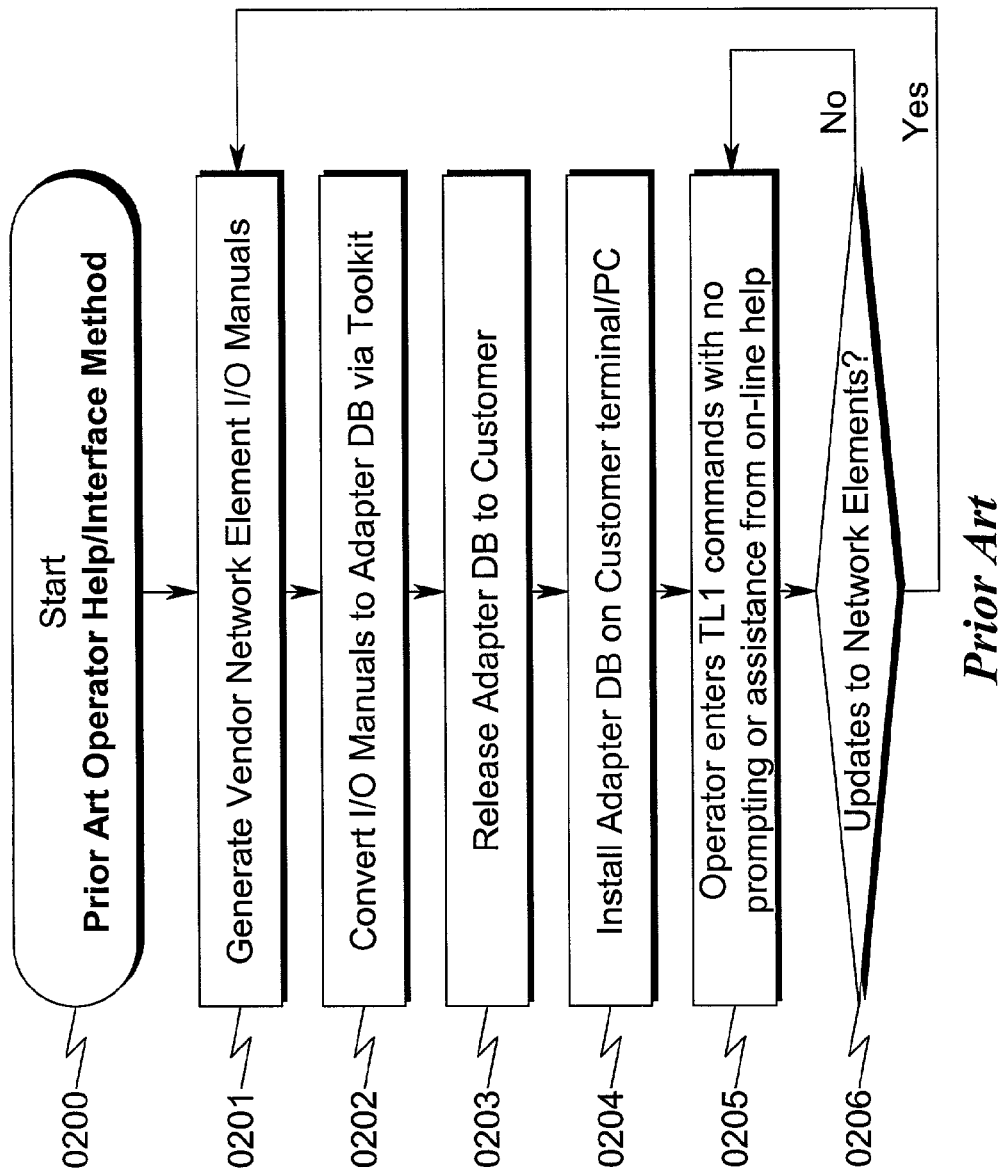
FIG. 2 illustrates a generalized method overview of the prior art.
Figure 3:
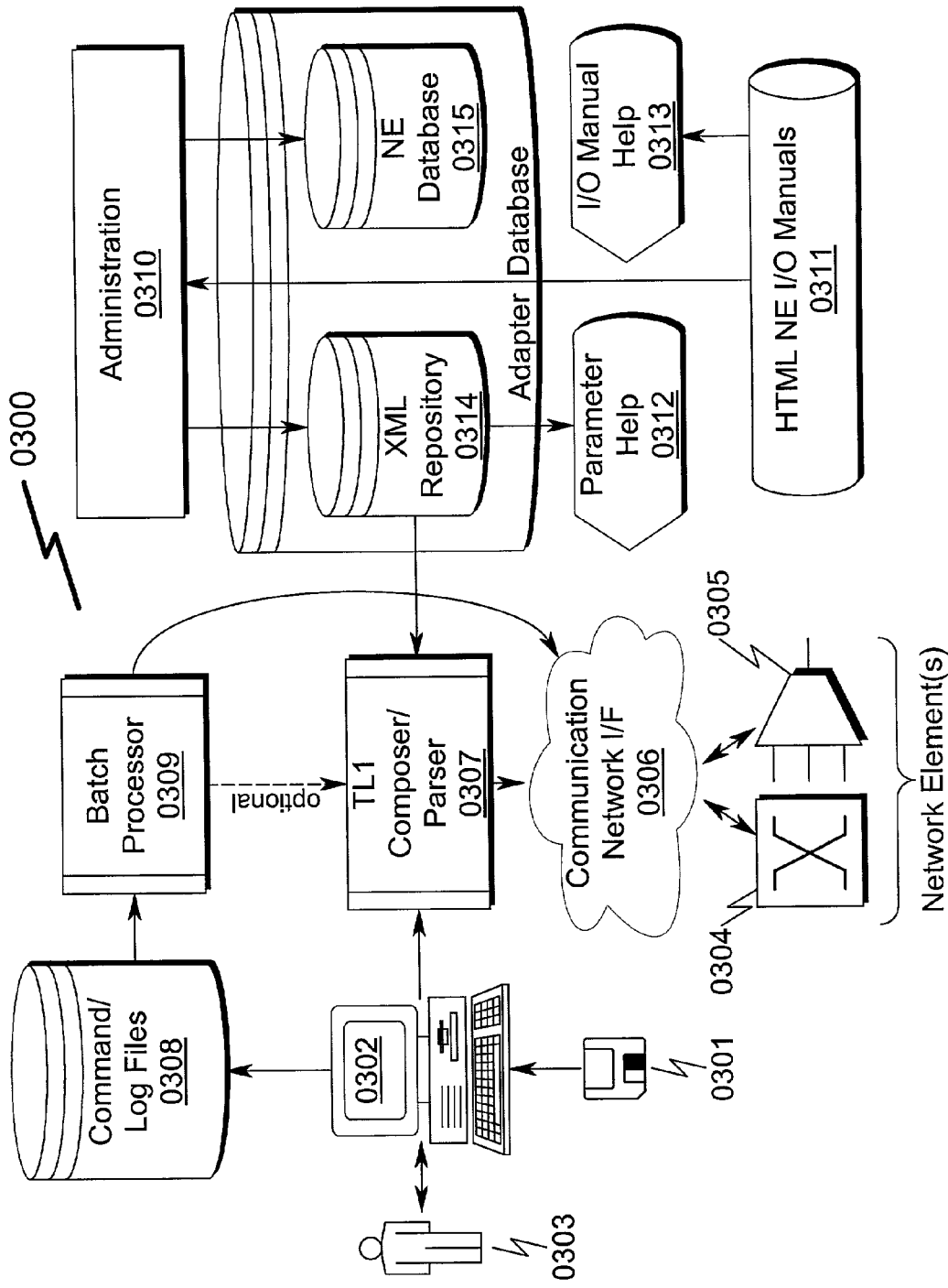
FIG. 3 illustrates a generalized system overview of the present invention.
Figure 4:
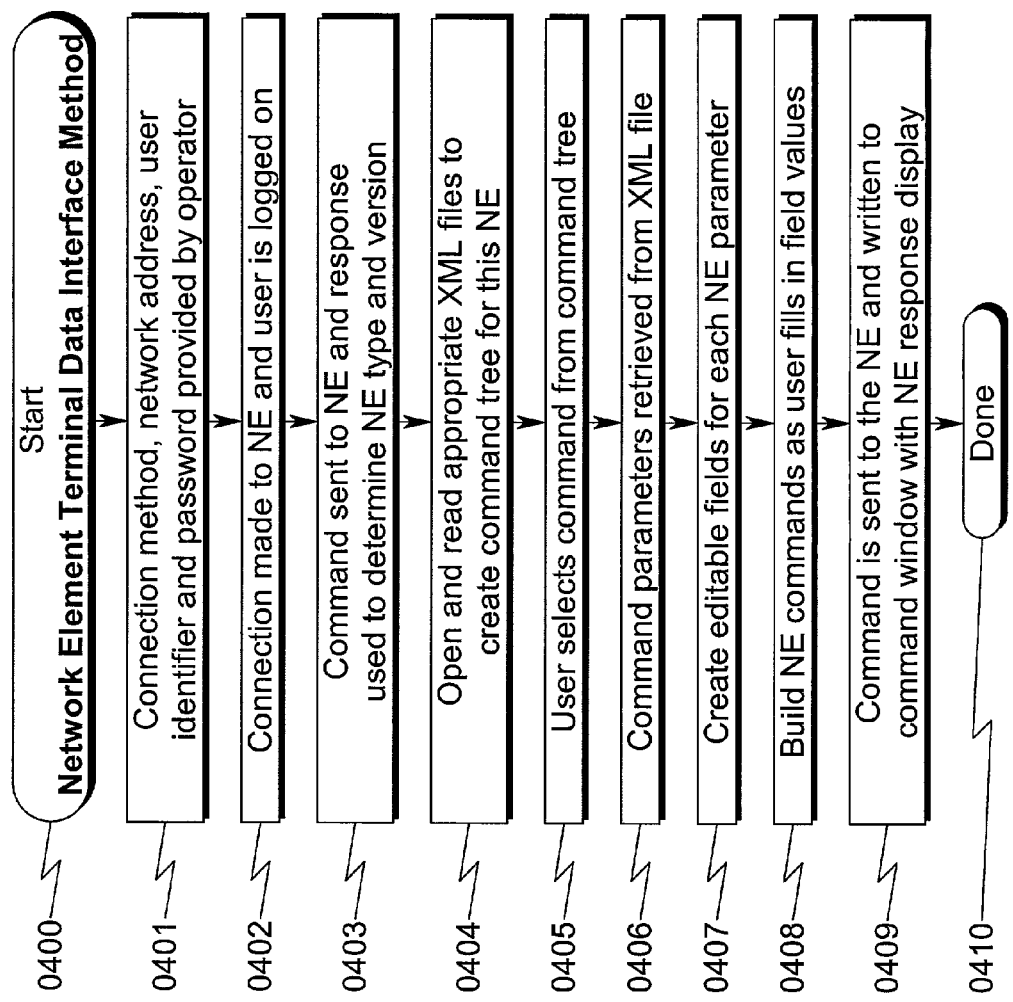
FIG. 4 illustrates a generalized method overview of the present invention.

While this invention is susceptible of embodiment in many different forms, there is shown in the drawings, and will herein be described in detail, various preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a NETWORK ELEMENT TERMINAL DATA INTERFACE SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Definitions

Throughout the discussion in this document the following definitions will be utilized:

System Blocks/Procedural Steps not Limitive

The present invention may be aptly described in terms of exemplary system block diagrams and procedural flowcharts. While these items are sufficient to instruct one of ordinary skill in the art of the teachings of the present invention, they should not be strictly construed as limiting the scope of the present invention. One skilled in the art will be aware that system block diagrams may be combined and rearranged with no loss of generality, and procedural steps may be added or subtracted, and rearranged in order to achieve the same effect with no loss of teaching generality. Thus, it should be understood that the present invention as depicted in the attached exemplary system block diagrams and procedural flowcharts is for teaching purposes only and may be reworked by one skilled in the art depending on the intended target application.

Personal Computer not Limitive

Throughout the discussion herein there will be examples provided that utilize personal computer (PC) technologies to illustrate the teachings of the present invention. The term 'personal computer' should be given a broad meaning in this regard, as in general any computing device may be utilized to implement the teachings of the present invention, and the scope of the invention is not limited just to personal computer applications.

Internet/Intranet not Limitive

Throughout the discussion herein the terms Internet and Intranet will be used generally to denote any network communication system or environment. Generally the term Intranet will denote communications that are local to a given system or user, and Internet will describe communications in a more distant locale. One skilled in the art will recognize that these terms are arbitrary within the contexts of modern communication networks and in no way limitive of the scope of the present invention.

The present invention specifically anticipates that in some implementations the GUI development framework (and/or its runtime component) will communicate with the data used to drive the GUI over the Internet. Thus, the application driving the user interface may reside on one computer system and the data used for presentation and control may be contained somewhere else on another computer system and be accessed via any number of networking protocols. The physical medium used to affect this communication may be any number of network interfaces, including but not limited to the use of serial ports to communicate with various network elements and the like. Data residency may be in any number of forms well known in the art, including but not limited to hard disk drives, CDROMs, DVDs, etc.

Application Programming Interface (API) not Limitive

While the present invention may be in part implemented using standard Application Programming Interfaces (APIs) such as Software Development Kits (SDKs) and the like, there is no requirement that the present invention be implemented using these tools. Note also that the framework of the present invention may be incorporated into standard toolkits and the like which may or may not be integrated into an API framework for use in standard software development frameworks.

Graphical User Interface (GUI) not Limitive

While the present invention may be in part implemented using a standard Graphical User Interface (GUI) such as that available in Microsoft® and Linux® Operating systems, there is no requirement that the present invention be implemented using these tools. The GUI presented herein may be rearranged to have a different order, different labels, colors, types of controls, and other ergonomic features without loss of generality in the teachings of the present invention.

Operating System not Limitive

Additionally, while the present invention may be implemented to advantage using a variety of Microsoft® operating systems (including a variety of Windows™ variants), nothing should be construed to limit the scope of the invention to these particular software components. In particular, the system and method as taught herein may be widely implemented in a variety of systems, some of which may incorporate a graphical user interface. Some examples of these include HP-UX™, LINUX™, SOLARIS, and UNIX™ (and its variants), among others.

Data Files/Structures not Limitive

The present invention may be embodied in a variety of data files/structures in some preferred embodiments. However, the form of such data files/structures as described herein is only exemplary. One skilled in the art would quickly realize that a wide variety of other data files/structures could be used equivalently in this application. Therefore, no data file/structure contained herein should be interpreted as limiting the scope of the present invention.

TL1 Commands not Limitive

The present invention may employ the use of a wide variety of TL1 commands to communicate with a wide variety of network elements. None of the TL1 commands and/or other NE specific commands described herein should be construed as to limit the scope of the present invention. In fact, both the TL1 language and the NE specific commands used to implement the present invention are completely arbitrary and do not limit the teachings of the present invention. For example, the RTRV-PRMTR-NE command used to determine NE characteristics is an example of a NE command that can be implemented in a wide variety of ways on a wide variety of network elements.

Acronyms

Within this context, the following acronyms will be used to describe the exemplary system context for the present invention application:
ASCII American Standard Code for Information Interchange
CRB Change Review Board
DDTS Fault Report System
DTD Document Type Definition
EDD Group Electronic Document Deliverables group
EML Element Management Layer
GEM Generic Element Manager
HTML Hypertext Mark-up Language
I/O Input/Output
JAR Java Archive File
JRE Java Runtime Environment
LOC Lines of Code
NE Network Element
NML Network Management Layer
NMS Network Management System
Os Operating System (e.g. Network Management Application)
PERL Practical Extraction and Reporting Language
PY Person Years
SIT System Integration Test
SVT System Validation Test
SW Software
TCP/IP Transmission Control Protocol over Internet Protocol
TLD Top Level Design
TL1 Transaction Language 1
TL1DAT TL1 Direct Access Terminal
UID User Identifier
XML Extensible Markup Language Exemplary System Overview (0500)

Figure 5:
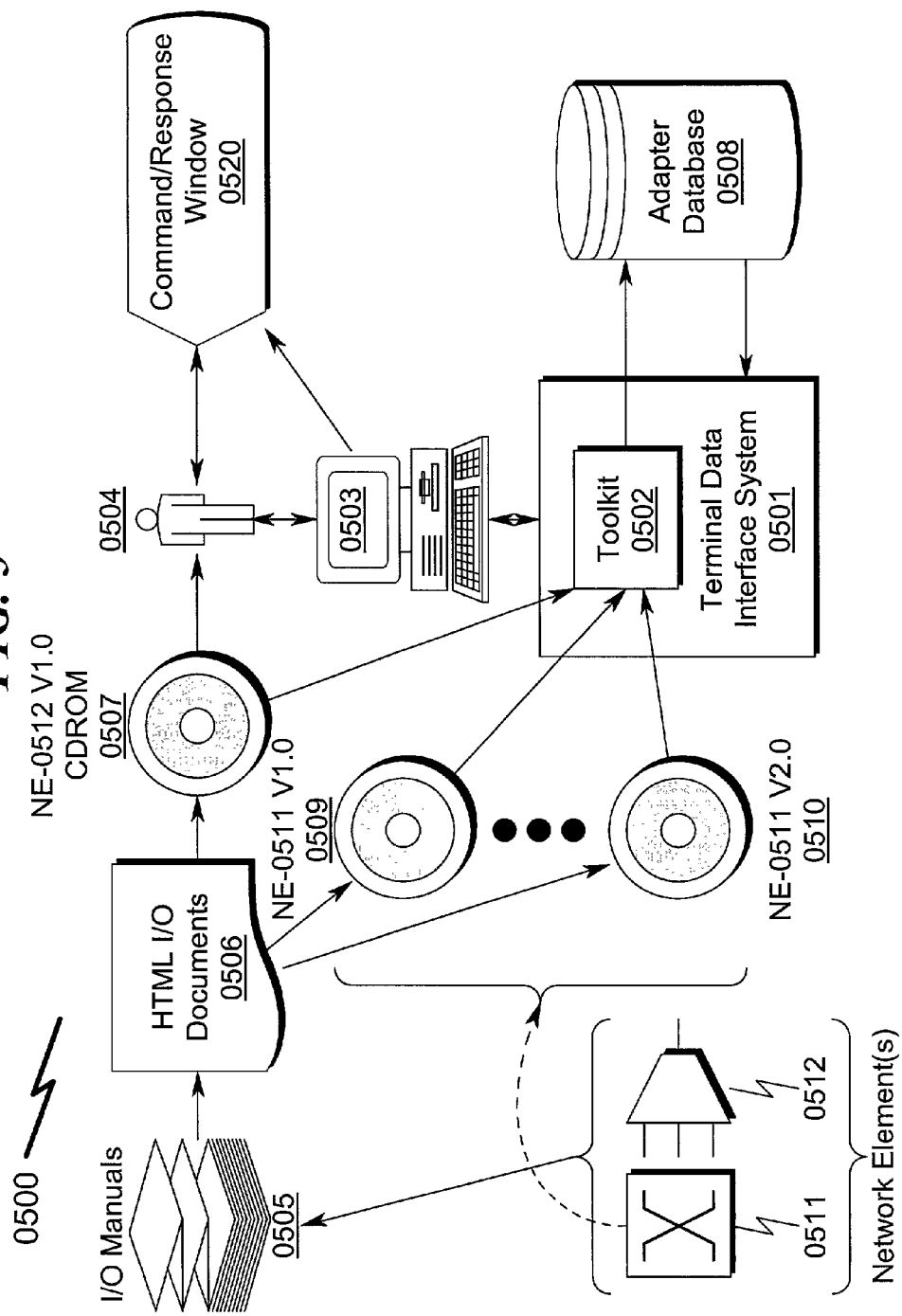
FIG. 5 illustrates an exemplary system overview of the present invention.

As illustrated in FIG. 5 (0500), the present invention incorporates a "toolkit" (0502) into the terminal data interface system software (0501) installed by the customer (0504) on the EML terminal (0503). The I/O manuals (0505) for a network element are converted into an HTML format (0506) and saved on a CDROM (0507). The CDROM (0507) is delivered to the customer (0504) who merely uses a command on a pulldown menu of the terminal data interface system software (0501) to direct the software (0501) to create an adapter database (0508) for that network element. Other network elements can easily be added by merely delivering the CDROM (0507) to the customer who can use this same command to create directly the adapter database (0508). The customer can then choose to communicate with either network element. To upgrade or update the network element(s), other CDROM(s) (0509, 0510) for the network element(s) (0511, 0512) with revisions are sent to the customer who merely has to execute a software command to create an updated adapter database for that particular network element. Note that to upgrade the TL1DAT application, the CDROM would not be network element specific and would generally be a different command than that used to upgrade the element manager.

By creating the adapter database (0508) via installation of a network element (0511, 0512), an easy-to-use interface (called "Enhanced Mode") for entering TL1 commands and receiving responses is created for that network element. In Enhanced Mode, the application provides an area in the command window (0520) where TL1 commands can be constructed by filling in fields for each command parameter. The application is standalone and portable. Information about the TL1 commands resides in the adapter database (0508) and is used by the terminal data interface system (0501) in constructing the command window (0520).

If there is no adapter database for a network element, the customer can still directly communicate with the network element in "Basic Mode" using TL1 commands that are typed in manually.

The present invention provides the customer/operator a portable, general purpose TL1 solution that is easily extensible to immediately support new network elements and bug fixes with no code changes. The system as detailed herein may be connected to a network element in a variety of networking configurations. The system provides the customer with immediate access to fully hyperlinked vendor documentation and helps navigate the operator to the proper TL1 command, and facilitates syntactically correct composition of the TL1 commands. Thus, the invention as described increases customer productivity and ease of use while reducing customer error.

Communications (0306)

The communications subsystem is used to establish a connection between TL1DAT and the NE. It also takes care of logging in and out of the NE. TL1DAT is capable of connecting to an NE using a serial port, TCP/IP port, and/or telnet port.

NE Connection User Interface (1500)

There are two windows used to obtain information needed to connect to the NE. The SerialPortDialog class is used to collect baud rate, flow control in, flow control out, data bits, stop bits and parity values for serial port connections. TL1DataLoginDialog (1500) collects user identifier, password, connection type, hostname and port ID. All of this information, except password, is stored in the connect.dat file or an equivalent mechanism. This file is used to initialize the window when it is displayed.

Gateway

The Gateway interface is used to hide the details of connecting, reading and writing to the connection stream. The DefaultGateway class implements the Gateway interface and defines methods for startup, shutdown and reading messages from the input stream. TCPGateway, SerialGateway and TelnetGateway all extend DefaultGateway and implement the actions that are specific to the connection type. Any changes in the gateway's state invoke the TL1DataAgent.propertyChange method.

The gateway forwards responses to whichever TL1ObjectHandler class is currently registered. Only one class is allowed to receive responses at a time. Once a class is registered, all messages that are received from the gateway are sent to the handleTL1Object method. TL1DAT uses three TL1ObjectHandlers: TL1DataLoginHandler, TL1DataLogoutHandler and TL1DataAgent.

Login Handler—TL1DataLoginHandler

The login handler receives all responses until the responses to the ACT-USER and RTRV-PRMTR-NE (or equivalent NE specific) TL1 commands are received. Any messages received other than ACT-USER or RTRV-PRMTR-NE is written into the User Interface's response window. If the ACT-USER was successful, the RTRV-PRMTR-NE is issued. If the ACT-USER command was denied or timed-out, the connection is terminated and the login window is displayed. If the RTRV-PRMTR-NE command was successful, TL1DAT is displayed in enhanced mode (if the correct XML files exist). If the RTRV-PRMTR-NE command was denied or timed-out, TL1DAT is displayed in basic mode. The last action that the login handler executes is registering TL1DataAgent Handler as the new response listener.

Logout Handler—TL1DataLogoutHandler

The Logout Handler is used whenever a request to terminate the connection is received. It sends a CANC-USER command to the NE. When a response to the CANC-USER command is received, or the command times-out, gateway-.disconnect( ) is called; if the user was not exiting the application, the login window is displayed.

DataAgent Handler—TL1DataAgent

TL1DataAgent receives all responses between the login and logout procedures. It writes everything it receives to TL1DAT's User Interface's response window. No correlation between commands and their responses is performed and the responses are not parsed or processed.

Writing Commands

TL1 commands are sent to the NE using BackgroundCommandHandler. BackgroundCommandHandler runs in a separate thread. Requests to send a command to the NE are sent to BackgroundCommandHandler via the handleTL1Command method. This method queues the request into a synchronous queue. When a request is entered into BackgroundCommandHandler's queue, it wakes up, reads the queue and sends the command.

Administration (0310)

The Administration subsystem (0310) is responsible for adding and deleting NE types/versions from the NE database (0315). Before TL1DAT can work in enhanced mode for a NE type/version the I/O manual to be referenced has to be specified. Support can only be added for the type/version of NE to which the TL1DAT is currently connected.

The user interface for the administration subsystem is viewed by selecting the "Install NE" item under the "File" menu. The TL1DAT Administration User Interface displays a table of currently supported NE types/versions. It also provides buttons to add and delete support for an NE type/version.

The "Add" button adds support for the NE to which TL1DAT is currently connected. When the "Add" button is pressed, a file browser is displayed to enter the directory location of the correct I/O manual. No check is performed to verify that the I/O manual matches the type/version of NE to which the TL1DAT is connected. Since there are usually not many changes in the I/O manual from one release to the next, an old I/O manual can be used to provide support for all of the unchanged commands.

The "Delete" button deletes support for the NE type/version that is selected in the table.

HTML-to-XML Conversion

Overview (0600, 1800)

An integral improvement in many embodiments of the present invention is the ability to automatically generate on-line help files (via an XML repository and/or adapter database) from network element documentation. This process is generalized by the data flow illustrated in FIG. 6 (0600) and the generalized flowchart in FIG. 18 (1800).

In this generalized exemplary embodiment, a TL1Direct Access Terminal (TL1DAT) retrieves the command information from two XML files (0605, 0607) comprising the adapter database (0508). The XML files are typically stored in an Application/xml directory. These files are created from parsing the HTML I/O Manuals (0603) (an example of which is illustrated in FIG. 7 (0700)) using the PERL scripts I/OManual.pl (0604) and I/OManualMenu.pl (0606). These PERL scripts are typically stored in an Application/tools directory. Note that these HTML I/O Manuals may originate from a variety of sources, including Interleaf I/O documents (0601) that may be converted (0602) to HTML via a variety of processes well known in the art and not specifically limited to the use of PERL scripts.

Script I/OManual.pl (0604) retrieves all the information about the TL1 commands and stores it in an XML file (0605) using the following naming convention:

<NE Type><NE Stream><NE Version>.xml.

An exemplary translation of the HTML I/O manual listed in FIG. 7 (0700) by the I/OManual.pl (0604) PERL script is provided for reference in FIG. 8 (0800). One skilled in the art will quickly recognize how this translation via PERL scripts or other equivalent mechanisms can be affected.

Script I/OManualMenu.pl (0606) uses the Command Entry Menus Appendix of the I/O manual and retrieves a list of all the TL1 command codes, grouped by functionality. This information is stored in an XML file using the following naming convention:

<NE Type><NE Stream><NE Version>M.xml.

Figure 18:
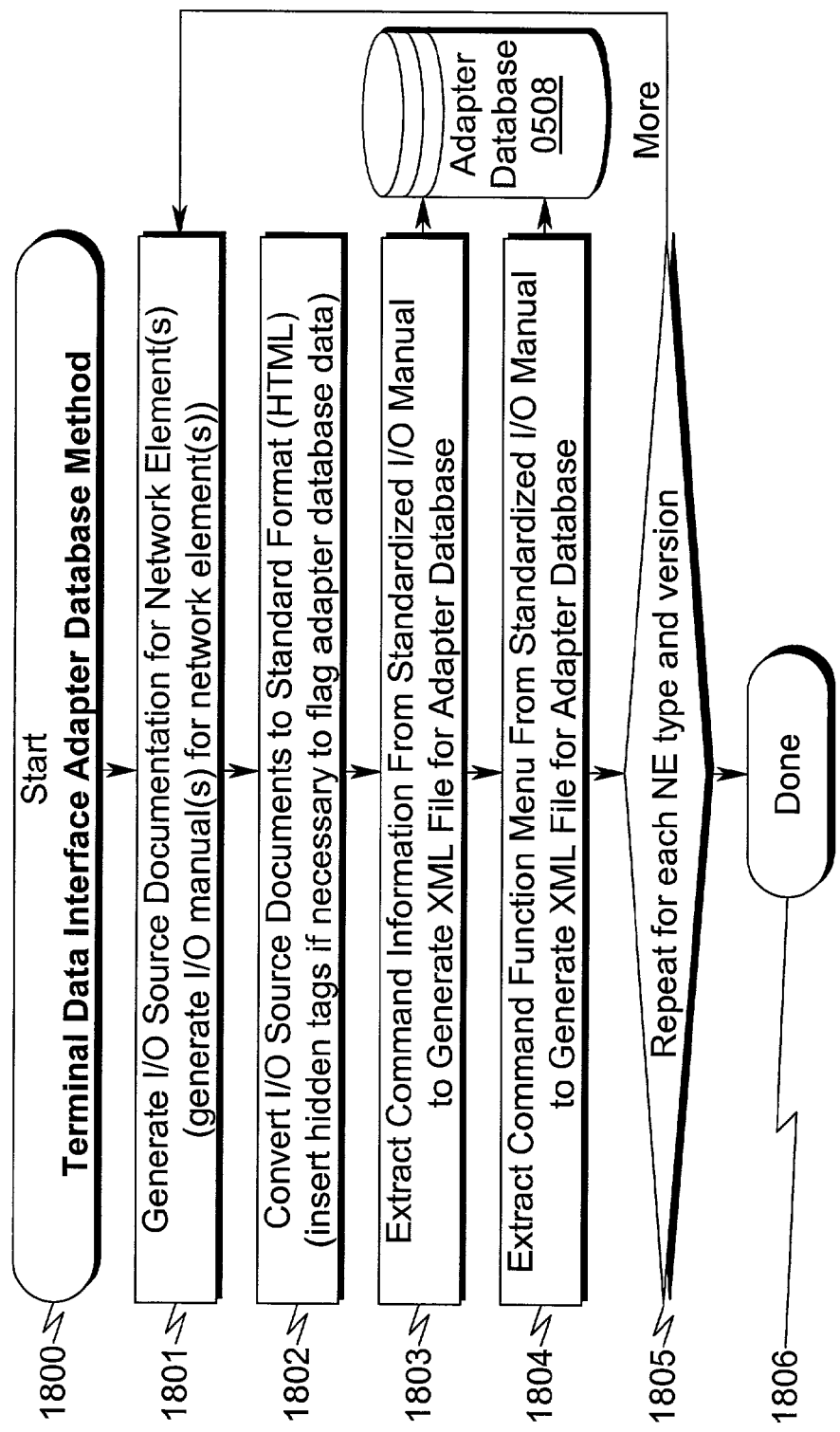
FIG. 18 illustrates an exemplary flowchart showing a preferred embodiment of a method used to automatically generate an adapter database from network element source documentation.

Thus, the generalized method associated with the data flow illustrated in FIG. 6 (0600) can be given by the flowchart of FIG. 18 (1800) wherein the major process steps associated with generation of the adapter database (0508) comprise:

1. Generating I/O source documentation for network element(s) (1801). This generally involves the generation of I/O manual(s) for the network element(s).
2. Converting the I/O source documents to a standard file format (such as HTML) (1802). This may involve inserting hidden tags if necessary to flag specific adapter database data.
3. Extracting command information from the standardized I/O manuals to generate XML file for the adapter database (1803).
4. Extracting the command function menu from the standardized I/O manual to generate an XML File for the adapter database (1804).
5. Repeating steps (1)–(4) for each network element type and version (1805).

One skilled in the art will recognize that there are a plethora of mechanisms available to software developers to implement the above method, not necessarily limited to the use of PERL or other command scripts to perform the necessary database extractions.

Example (0700, 0800)

FIG. 7 (0700) illustrates an exemplary HTML file excerpt for the CHG-TL-DIG command as an example of a TL1 command that has required parameters and one with a list of values (which becomes a drop-down list in TL1DAT). This is a valid HTML file and what is shown is all that is needed to work with the PERL script—all other extraneous information from the original file was removed.

FIG. 8 (0800) illustrates an exemplary XML file excerpt that is the result of running the HTML file of FIG. 7 (0700) through the I/OManual.pl PERL script (0604). Generally, one skilled in the art will recognize that the following must be supplied to these PERL scripts to affect the desired translation:

1. NE product name (e.g., 1631SX),

2. NE stream name (e.g., LMC-APS),

3. NE release/version number (e.g., R10.00), and/or 4. filenames to process.

One skilled in the art will recognize that other parameter combinations are possible. Items 1–3 are what are retrieved from the RTRV-PRMTR-NE command at login and are provided to the PERL script by TL1DAT; the location of the files to process are specified by the user when installing the NE (location of the I/O Manual). The name of the resulting XML file is generally a concatenation of items 1–3. There is more content within an actual XML file (DTD information at the top, header-type elements, etc.), which will be well known to one skilled in the art.

Generalized Translation Method (1900, 2000)

The translation of NE I/O manuals to corresponding adapter databases used to construct network element terminal interfaces is a specific example of the more generalized method taught by the present invention which involves the use of XML files as a source repository for all information necessary to describe a network element or some other equipment function. From this XML description, the present invention teaches that a wide variety of documentation and software interfaces can be readily generated automatically given the right filtering paradigm.

Figures 19, 20:
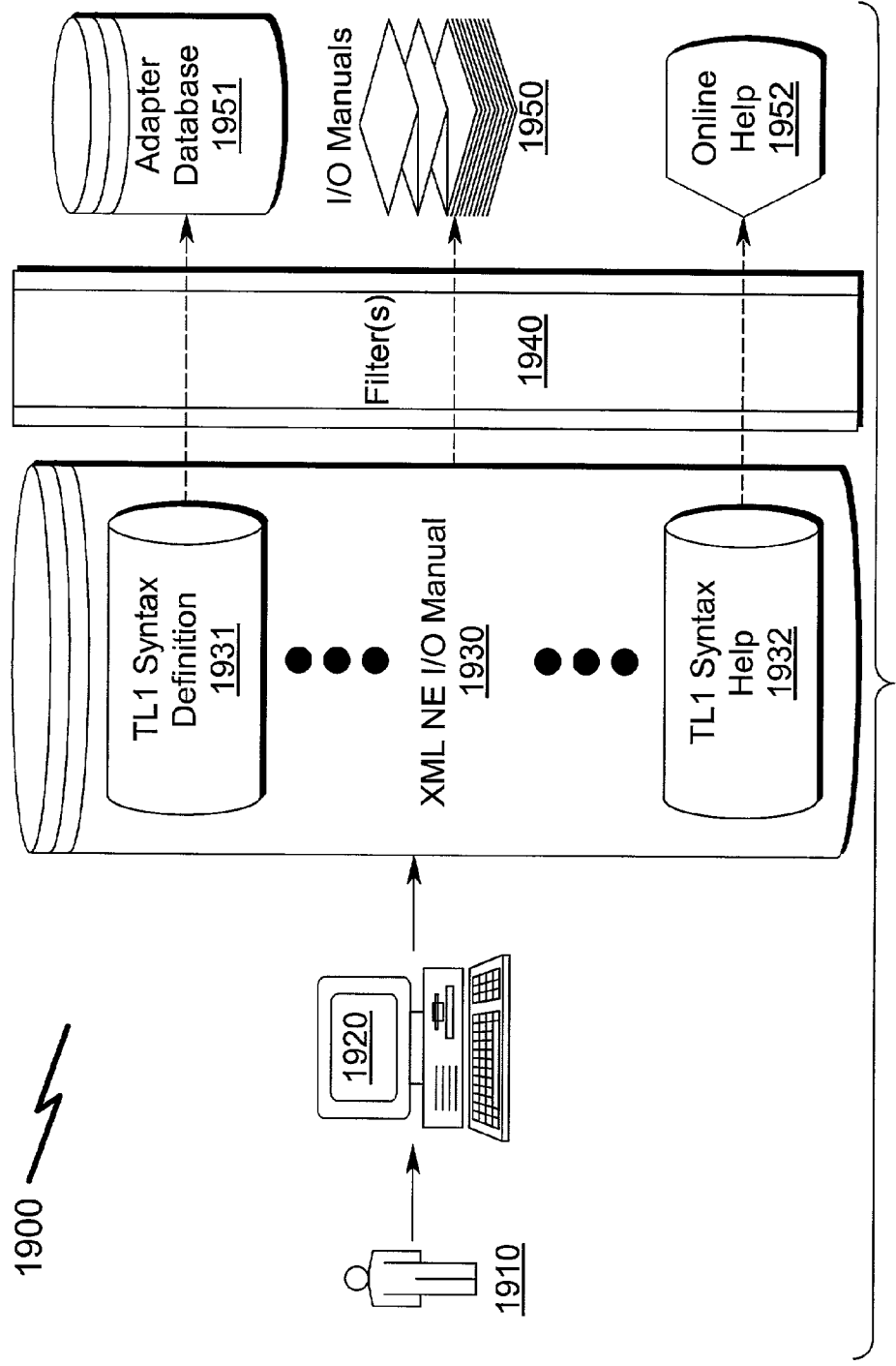
FIG. 19 illustrates an exemplary data flow of a generic method of producing terminal data interface modules from a source XML network element I/O manual as taught by the present invention.
FIG. 20 illustrates an exemplary flowchart of a generic method of producing terminal data interface modules from a source XML network element I/O manual as taught by the present invention.
Figure 20:
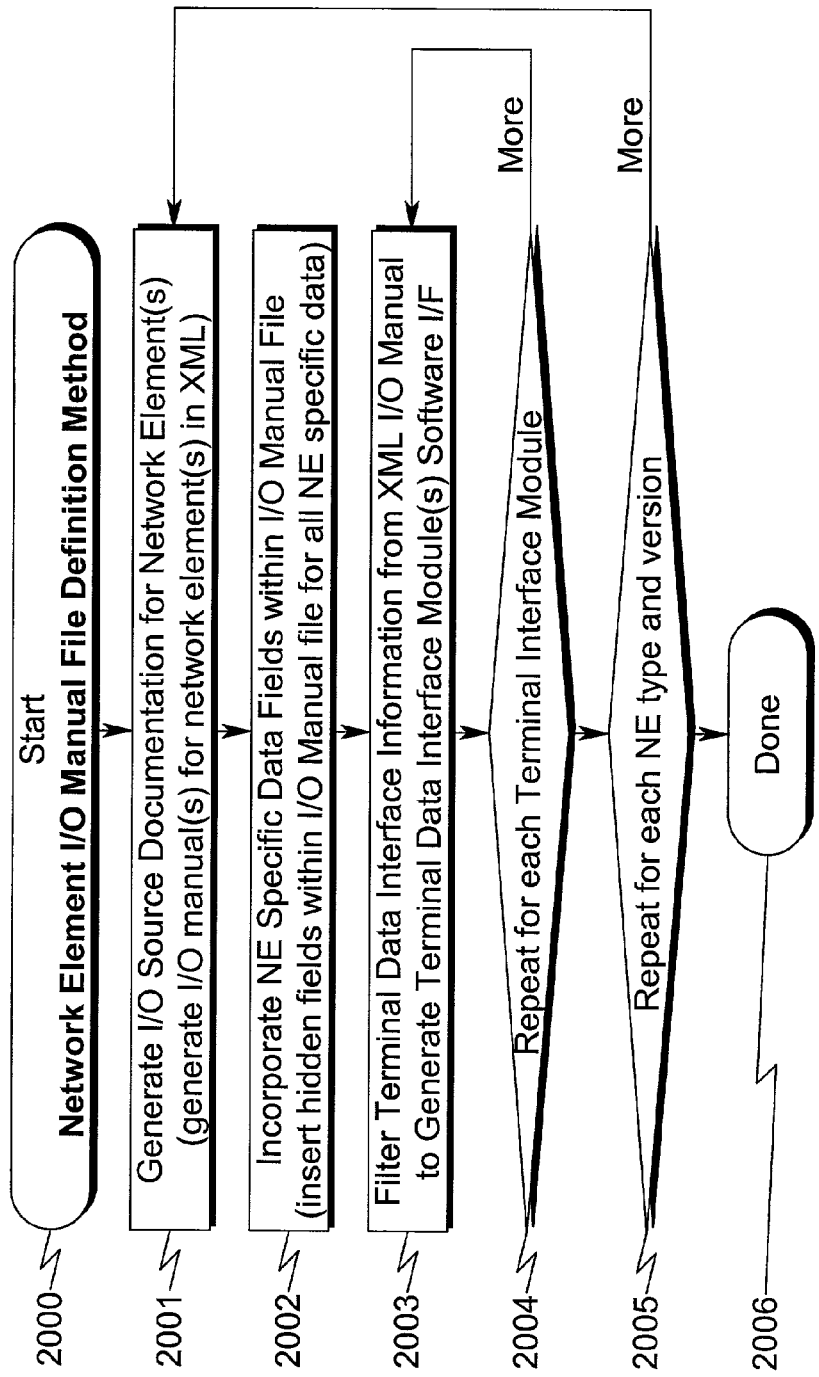

This generalized process in terms of data flow is illustrated in FIG. 19 (1900). In this generalized paradigm, a user (1910) who is typically a network element specialist, uses some data interface (1920) to generate an XML file (1930) that is the essential I/O manual for the network element. This I/O manual file (1930) may have several components (chapters, sections, etc.) that contain specific information related to NE specific features such as TL1 syntax (1931), on-line help (1932), or any other type of use information specific or generic to a particular network element.

By the use of any number of filters (1940) that can be implemented in a wide variety of ways, the I/O manual file (1930) can be filtered to extract information necessary to construct the normal I/O manual reference (1950), adapter database (1951), on-line help subsystem (1952), and any number of other functions and/or features that are normally associated with a software interface necessary to support the network element.

This approach greatly reduces the development and maintenance effort associated with network element support and terminal interface software by permitting a generic XML file (1930) to incorporate all information associated with and important to the network element. The I/O manual (1930) can then be expanded at will to incorporate new network element features without a need to redeploy software to all existing network element installations. This data-driven approach also drastically reduces the complexity of terminal data interface software associated with network elements, as the complexity of command syntax and associated parameter variations is buried within the XML I/O manual file (1930) rather than being incorporated in terminal interface software.

Thus, the present invention teaches the use of an XML I/O manual file (1930) to fully define the feature set and command syntax of a given network element and the subsequent use of filters (1940) to extract necessary information in the form of I/O manuals (1950), adapter databases (1951), on-line help (1952) and the like from the I/O manual file (1930). This paradigm isolates the extraction of information (TL1 syntax, etc.) from some I/O manual source description from the usage of this information by an application, permitting a disconnection of the target application from a particular source for extracting the target information.

An exemplary method applying the data flow illustrated in FIG. 19 (1900) is illustrated in FIG. 20 (2000) and contains the following steps:

1. Generating an I/O manual source documentation XML file for a network element (2001).
2. Incorporating network element specific data fields within the I/O manual XML file (2002).
3. Filtering terminal data interface information from the I/O manual XML file to generate a terminal data interface module software interface (2003).
4. Repeating step (3) for each desired terminal data interface module to be extracted (2004).
5. Repeating steps (1)–(4) for each network element type and version (2005).

One skilled in the art will recognize the power of the data-driven approach taught by the present invention as detailed in the above method steps and also realize that there are a wide variety of equivalent variations to the above method that do not depart from the general spirit of the disclosed invention.

Exemplary XML DTDs (2100, 2200)

Within each XML file as illustrated in FIG. 19 (1930) there may exist a number of Document Type Definitions (DTDs) used in the translation/filtering process. Examples of these DTDs are illustrated in FIG. 21 (2100) (from an autogenerated XML file of TL1 commands) and FIG. 22 (2200) (for an exemplary menu hierarchy). One skilled in the art will recognize that the data-driven document structure disclosed within the present invention permit a wide variety of DTDs to be incorporated to permit a wide range of data extraction processes to occur with respect to the I/O manual source documentation.

Exemplary Update Method (0900)

Figure 9:
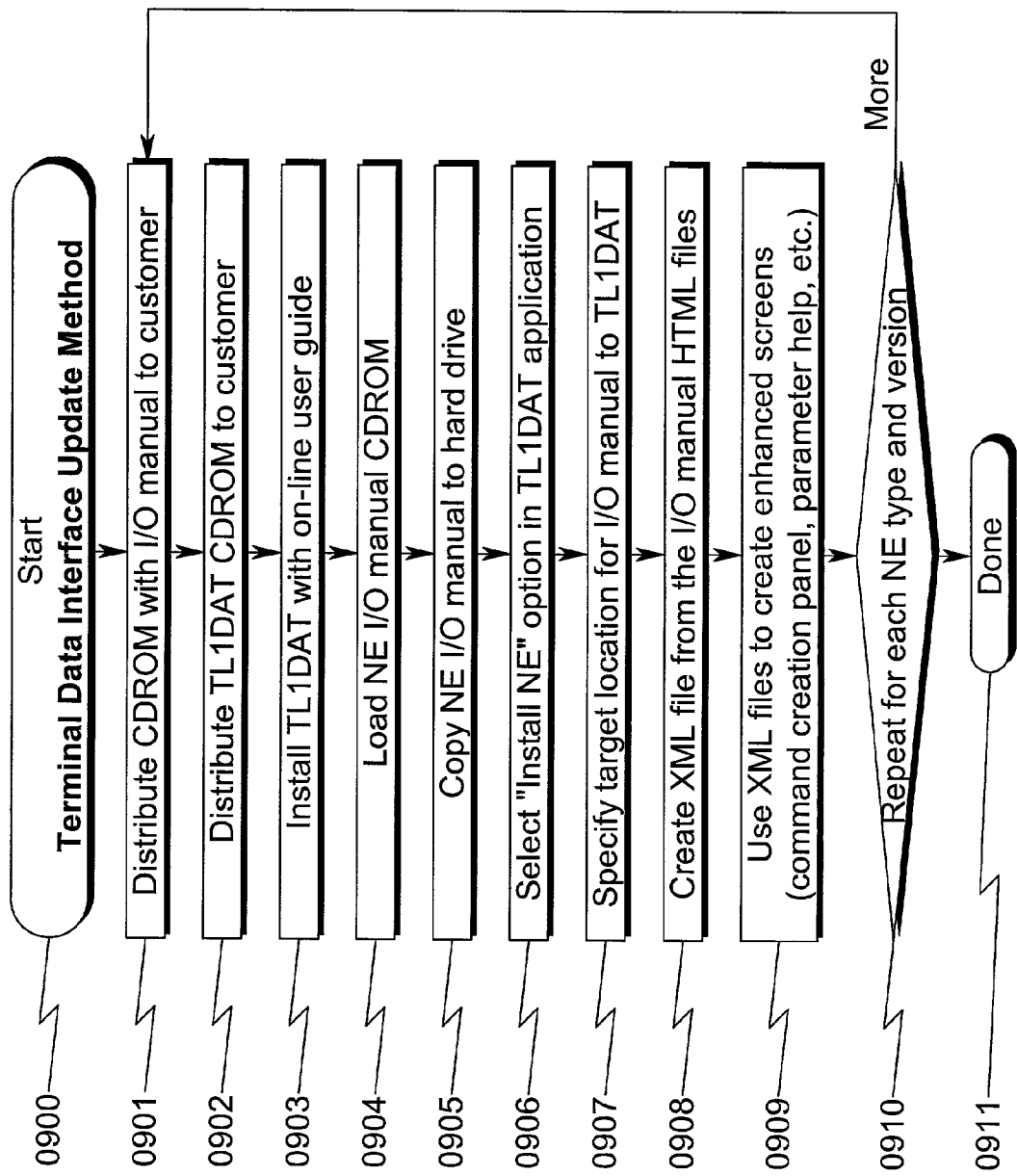
FIG. 9 illustrates an exemplary flowchart illustrating a terminal data interface update method.

The present invention presents a significant opportunity to provide for improved software distribution and maintenance functions involving network element terminal interfaces. Specifically, as illustrated in FIG. 9 (0900), the present invention may incorporate an update methodology comprising:

(1) distributing an I/O manual storage medium to a customer (0901);
(2) distributing a TL1DAT application storage medium to the customer (0902);
(3) installing the TL1DAT with an on-line user guide (0903) via the application storage medium;
(4) loading a network element I/O manual from the I/O manual storage medium (0904);
(5) copying the network element I/O manual to a local storage medium (0905);
(6) selecting a network installation option in the TL1DAT application (0906);
(7) specifying a target location for the I/O manual to the TL1DAT application (0907);
(8) creating an XML file from the I/O manual files (0908);
(9) using the XML files to create enhanced dialog screens for presentation to the customer (0909);
(10) repeating steps (1)–(9) as necessary for each network element type and/or version (0910).

While one skilled in the art will recognize that there are equivalent variants to this method, the gist of the disclosed invention permits updating the network element terminal data interface without the need for laborious and time consuming software distributions and/or installations that characterize the prior art. The disclosed method not only permits command trees to be automatically updated, it also permits the end-user tutorials and help files to be automatically updated as well, permitting a tighter integration of maintenance and support functions as compared to the prior art update methods.

Exemplary TL1DAT Operator/User Interface (1000, 1600, 1700)

Figure 10:
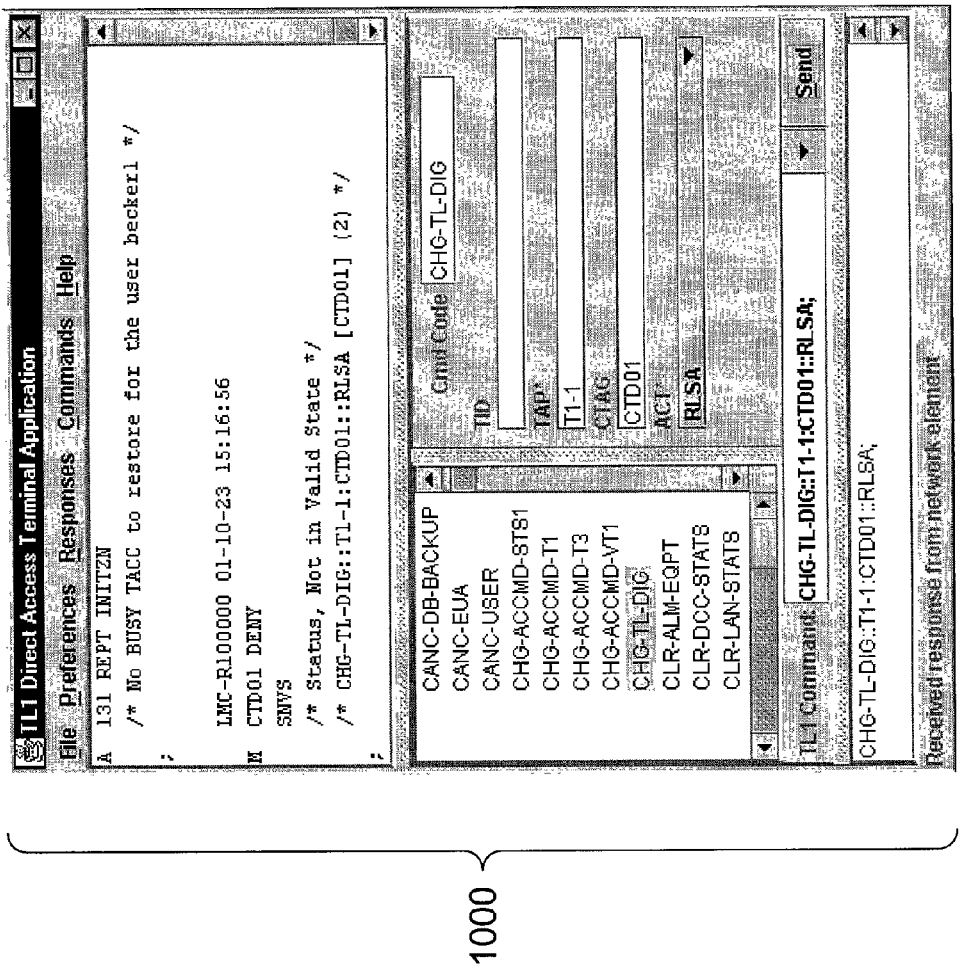
FIG. 10 illustrates an exemplary unannotated dialog screen generated from the XML file in FIG. 8.
Figure 11:
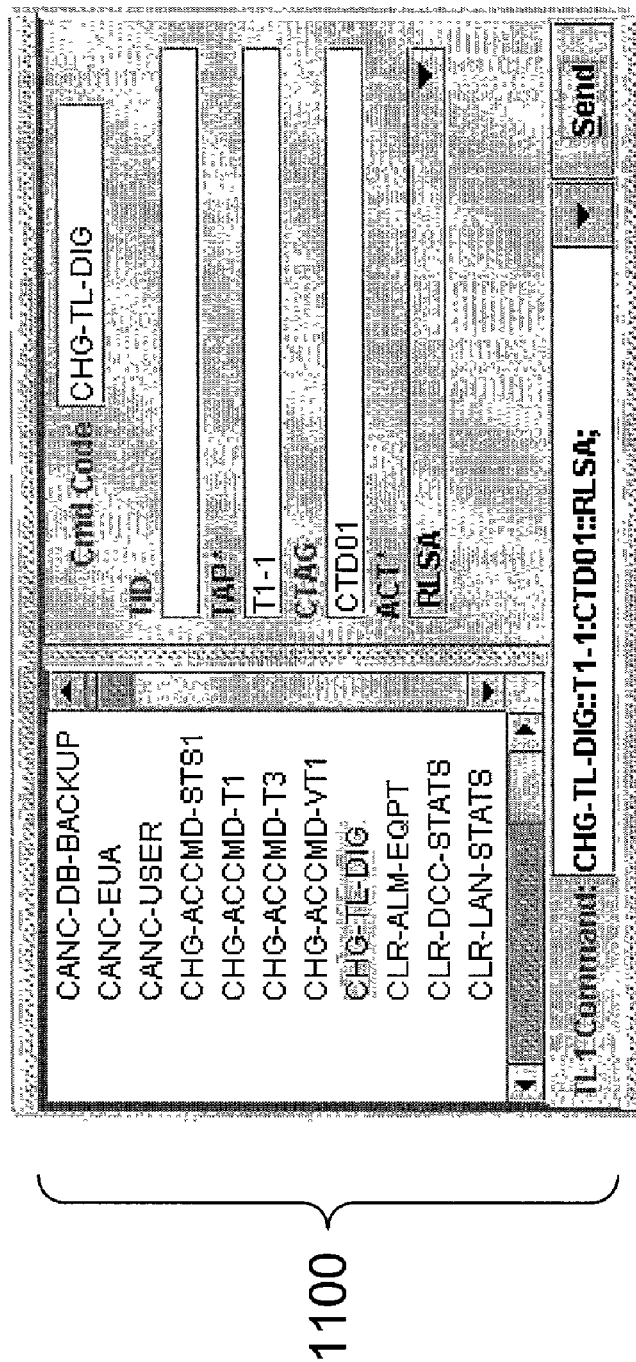
FIG. 11 illustrates an exemplary command area from the dialog box of FIG. 10.

The TL1DAT Operator/User Interface is divided into four main parts: menubar (1610), command window (1620), response window (1630), and the command creation panel (1640). Exemplary implementations of this user interface are illustrated in FIG. 10 (1000) (unannotated) and FIG. 16 (1600) (annotated). An abstraction of this concept is illustrated in FIG. 17 (1700).

Menu (1610)

Figure 16:
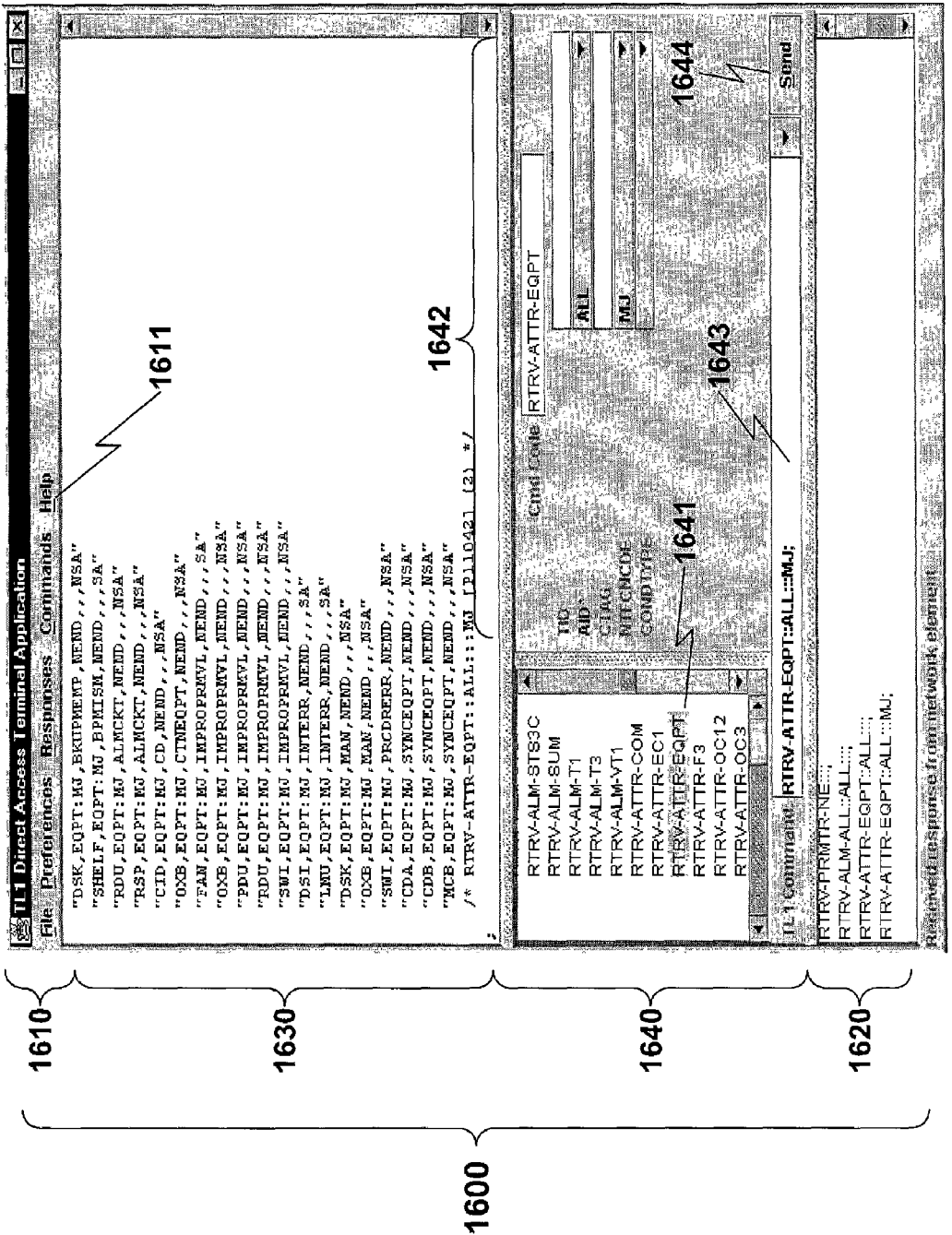
FIG. 16 illustrates an exemplary annotated TL1DAT operator interface dialog box.
Figure 17:
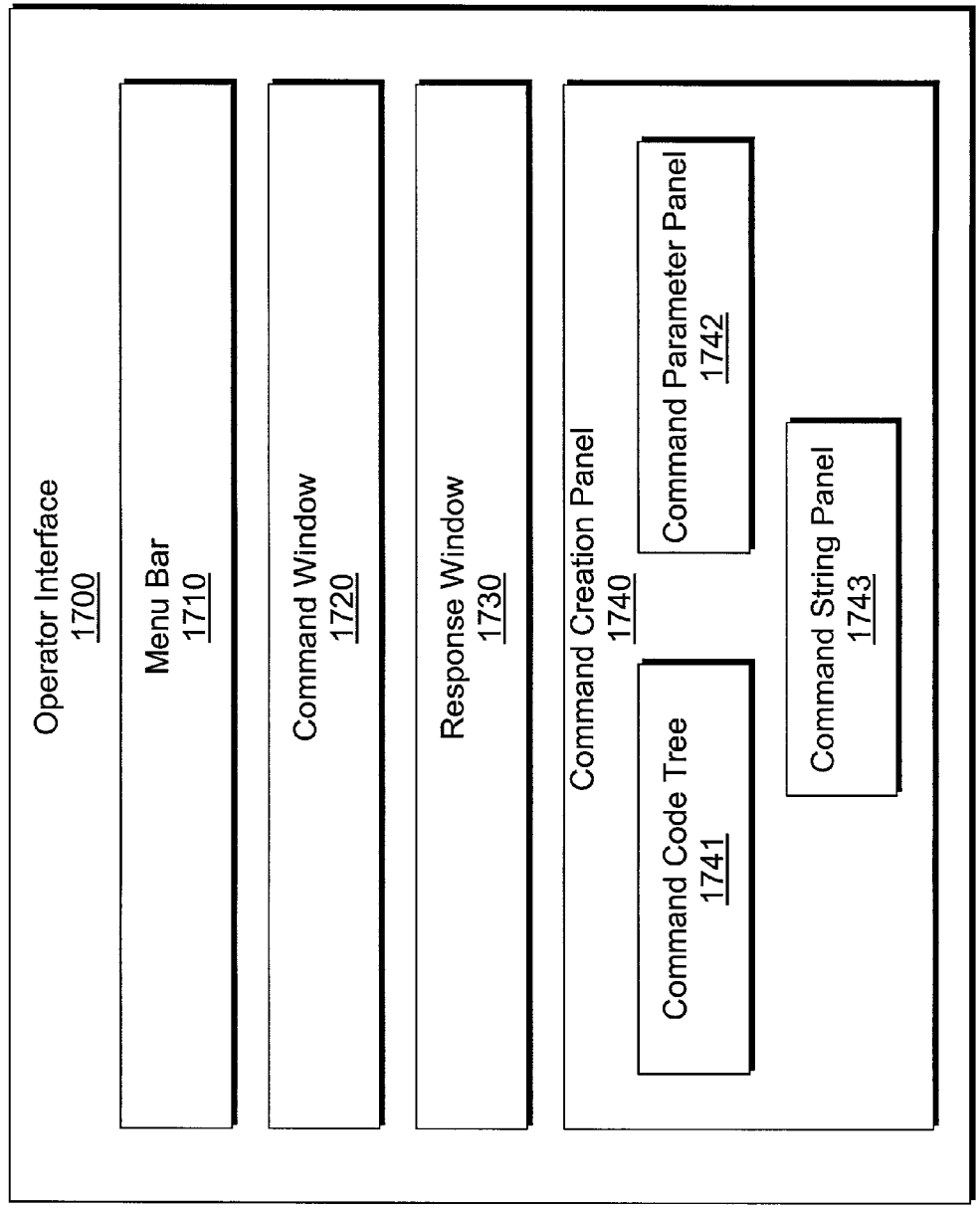
FIG. 17 illustrates an exemplary operator/user interface structure useful in some preferred embodiments of the present invention.

As illustrated in FIG. 16 (1600), the Menubar (1610) contains all of the possible activities a user can perform. The activities may include the following:

File
  Disconnect From NE—log out and close connection to the currently connected NE and display the login window
  Install NE—display the administration window to create/delete data files for NEs
  Exit—disconnect from the currently connected NE and exit the application
Preferences
Mode
  Enhanced—Allow user to create TL1 commands by filling in parameter fields.
  Basic—Allow user to type in a TL1 command directly, without any assistance.
Command Tree Ordering
  Alphabetical—Force command tree to display command codes in alphabetical order.
  Functional—Force command tree to display command codes grouped by their functionality. This may include display of commands by group or other type of function.
Responses
  Clear Window—Clear out all responses from the response window.
  Save—Save the current contents of the response window to a file. A file browser is displayed to aid in file specification.
  Record—Record future TL1 responses to a file. A file browser is displayed to aid in file specification.
Commands
  Clear Window—Clear out all commands from the command window.
  Clear Parameters—For each TL1 command code, TL1DAT remembers the values that are entered into the parameter fields. The "Clear Parameters" command returns the values for every TL1 command parameter to their default value.
  Save—Save the current contents of the command window to a file. A file browser is displayed to aid in file specification.
  Record—Record future TL1 commands to a file. A file browser is displayed to aid in file specification.
  Replay—Sends TL1 commands stored in a "recorded" command file to the NE. (Works for any ASCII file that has one TL1 command per line). A file browser is displayed to aid in file specification.
Help (1611)
  About—Display copyright and version information about the application.
  User's Guide—Displays help on how to use the TL1DAT application.
  I/O Manual—Brings up the contents page of the current NE's I/O manual in an HTML browser.
  Parameter Help—Displays information about the selected parameter in the Command Parameter panel.

Command Window (1620)

The command window (1620) displays all of the commands sent to the network element. The commands are displayed in a scroll pane so that the user can view past commands by scrolling up.

Response Window (1630)

The Response Panel (1630) displays all of the responses received from the network element. The responses are displayed in a scroll pane so that the user can view past responses by scrolling up.

Command Creation Panel (1100, 1640)

The Command Creation Panel (1100, 1640) is made up of three parts: Command Code Tree (1641), Command Parameters Panel (1642), and the Command String Panel (1643). All the information needed for these panels is retrieved from the XML files comprising the adapter database.

Command Code Tree (1641)—Displays all of the command codes, for the NE that is currently connected, either in alphabetical or functional order. Note that the Command Code Tree (1641) example provided in FIG. 16 is illustrated using alphabetical order and that other forms of group and/or functional order are possible. This would, for example, permit related commands (or commands that are typically sequenced) to be displayed for easy selection in the Command Code Tree (1641).

Figure 12:
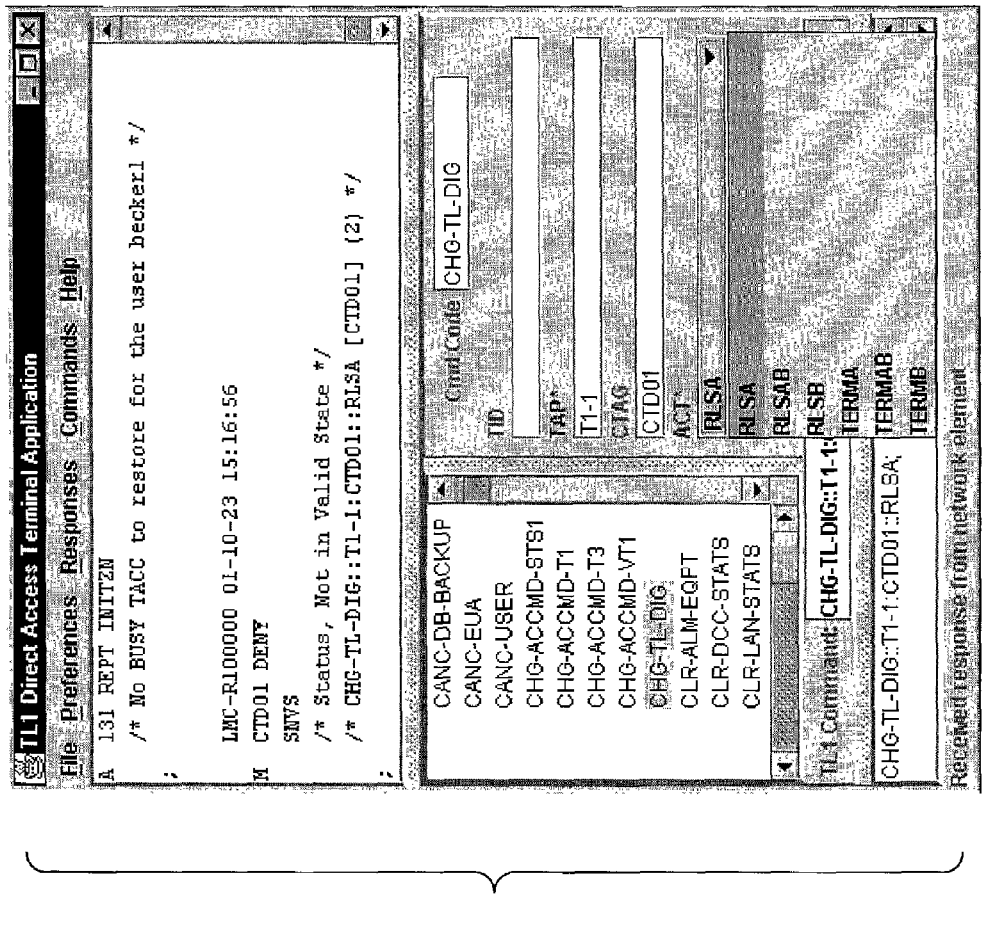
FIG. 12 illustrates an exemplary drop-down list from the dialog box of FIG. 11.
Figure 13:
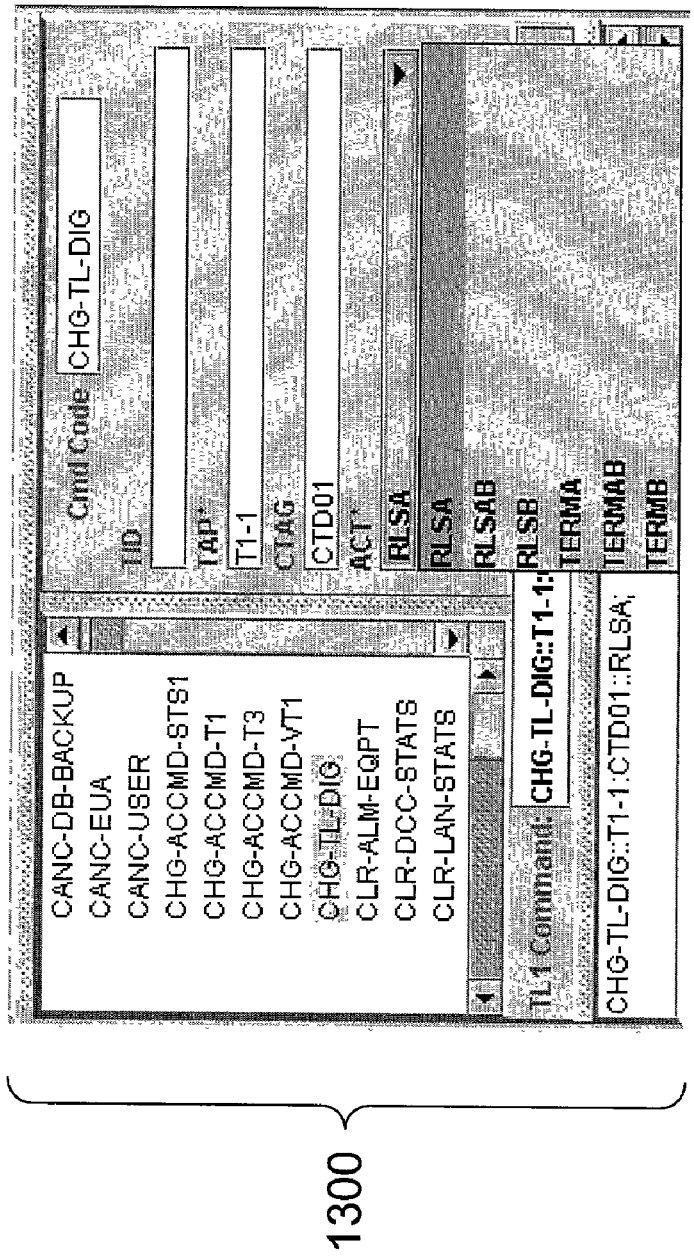
FIG. 13 illustrates an expanded exemplary view of the dialog box of FIG. 12.

Command Parameters Panel (1642)—This panel provides an editable entry field for each parameter available in this command. If a list of valid values is available for the parameter, the entry field will be a non-editable combo box as generally illustrated in FIG. 12 (1200) and FIG. 13. (1300). If no list of valid values is available, the entry field will be a text field.

Command String Panel (1643)—This Panel displays the TL1 command that is created with the values shown in the Command Parameters Panel. The command is sent to the NE by pressing the "Send" button (1644).

On-Line Help (1611)

The "Help" menu (1611) from the TL1DAT main window provides on-line help information about the TL1DAT application and the currently connected NE (provided the NE has been installed). A Netscape or Internet Explorer browser may be used to display the NE's I/O manual and TL1DAT on-line help.

About

This displays copyright and version information about the TL1DAT application.

Browser

If the "Help-I/O Manual" menu option is selected, the home page for the current NE's I/O manual will be displayed. If the I/O Manual button on the "Parameter Help" window is pressed, the browser will be brought up with the current command's page showing.

Parameter Help (1400, 1410, 1420)

As illustrated in FIG. 14 (1400, 1410, 1420), the "Parameter Help" window is accessed through the "Help-Parameter Help" menu option. It displays information about the selected parameter in the Command Parameters panel. The information about the parameter is retrieved from the XML file.

User's Guide

The user's guide displays information about using the TL1DAT application. It is accessed from the "Help-User's Guide" menu option. When this option is selected, the user's guide will be displayed in the browser.

Operator/User Interface Abstraction (1700)

An abstracted Operator/User Interface is illustrated in FIG. 17 (1700) and comprises a Menubar (1710), Command Window (1720), Response Window (1730), and Command Creation Panel (1740) that may optionally further comprise a Command Code Tree (1741), Command Parameters Panel (1742), and/or a Command String Panel (1743). One skilled in the art will recognize that there innumerable ways to implement this Operator/User Interface.

PREFERRED SYSTEM CONTEXT OF THE PRESENT INVENTION

Overview

While the present invention may be implemented with a wide variety of system contexts, several exemplary embodiments will incorporate one or more specific characteristics that are advantageous when applied to telecommunication networks.

Terminology

Within this context, the following terminology will be used to describe the exemplary system context for the present invention application:

Basic Mode No on-line help is available for TL1 commands

EDD Electronic Document Distribution

Enhanced Mode On-line help available for TL1 commands

GUI Graphical User Interface

HLD High Level Design

HTML Hyper Text Markup Language

NE Network Element

PFD Product Feature Document

TL1DAT TL1Direct Access Terminal

TRS Technical Requirements Specification

Generalized System Specifications (TL1DAT)

The following proposed application implements a Graphical User Interface for entering in TL1 commands. This application will be generic in scope as to allow portability of this application across several operating systems.

Currently, telecommunication network elements do not have a graphical user interface for users to enter in TL1 commands. The users must be very proficient and knowledgeable in the TL1 command language or have an I/O manual available to look up commands.

Also, network elements do not have the ability to set up scripts for ease of provisioning of the different shelf configurations or just to save a group of commands that are frequently used.

The features provided by the present invention provide a technician/user a graphical user interface for entering TL1 commands. This application provides a command window which displays the command and highlights required parameters. An on-line I/O manual may also be available. The implementation of this exemplary TL1 interface may include one or more of the following specific requirements in the context of a TL1 Direct Access Terminal application (TL1DAT):

The TL1DAT may be a stand-alone application that is portable.

The TL1DAT may be designed to be flexible and extendable to support new configuration functions without a major redesign or re-code of the product.

The TL1DAT may be started by an icon on the desktop within a Windows environment.

The TL1DAT may provide the user with the capability to send TL1 commands and to receive responses via a GUI interface.

All published commands for the network element may be supported in enhanced mode. Commands for previous releases of a network element shall be supported in basic mode, although if the I/O manual is available and adheres to the standard documentation format, the commands may be supported in enhanced mode.

The TL1DAT may be able to connect to a network element through a serial port.

The TL1DAT may be able to connect to a network element through an IP connection.

The TL1DAT may work in basic mode if a TL1 command file is not provided. The NE shall be addressable with TL1 commands, but no prompting information or error checking is provided. All TL1 commands may be entered through basic mode.

The TL1DAT may support in enhanced mode the currently supported TL1 NEs that provide an I/O manual that adheres to the standard documentation format.

The TL1DAT may display any NE alarms/messages in the response window that are sent to the logged-in user.

The TL1DAT may provide TL1 command syntactical and parameter prompting, as represented in the I/O manual, for mandatory and optional command fields when operating in enhanced mode.

The TL1DAT may provide the capability to select valid TL1 command parameters from an entry field/pick list when operating in enhanced mode. Valid pick list entries will only be available if the entries are defined in the I/O manual.

The TL1DAT may display all mandatory command fields distinctively for ease of identification when operating in enhanced mode. The mandatory fields may be highlighted red and marked by an asterisk.

The TL1DAT may provide the ability to create, save, retrieve, and run script files. This will be called record and replay. The user is responsible for script files.

The TL1DAT may maintain history records of entered TL1 commands.

The number of history records maintained in memory may be a pre-defined limit of 50 or some other value.

The history records may be displayed on the GUI presentation in an easily understandable manner. When the allocated display space is filled, a scroll bar presentation may be used.

The TL1DAT may have the ability to save the response output log to a user-definable location.

The TL1DAT may have the ability to retrieve any TL1 command from command history.

The TL1DAT may have the ability to edit any TL1 command from command history.

The TL1DAT may provide the capability to clear the response window.

All TL1DAT error/event messages may be presented to the user.

The TL1DAT may display the responses received from the NE for every TL1 command entered, as determined by the logged-in user. The responses may not be parsed but displayed only.

The TL1DAT may display every TL1 command entered (TL1 command history) up to the pre-defined limit.

Transient help shall be provided in the TL1DAT windows as deemed appropriate. When the mouse cursor is held over functional areas, a small help window may display the general function or title of the area. The continued movement of the cursor may dismiss the help window.

The TL1DAT may provide access to on-line help that describes how to use the application.

The TL1DAT may provide the capability to access the NE's I/O manual on-line for the current command/field.

The TL1DAT may provide the capability to bring up context-specific help for each parameter of a command.

The TL1DAT may provide the capability for the user to display help from the I/O manual. When the user selects this option, the contents page is displayed.

The TL1DAT may support multiple versions of an NE.

The TL1DAT may allow multiple versions of an NE to use the same I/O manual pages and commands information.

The TL1DAT may determine the mapping from NE software version to I/O manual page location and command information during installation of the I/O manual.

Figure 15:
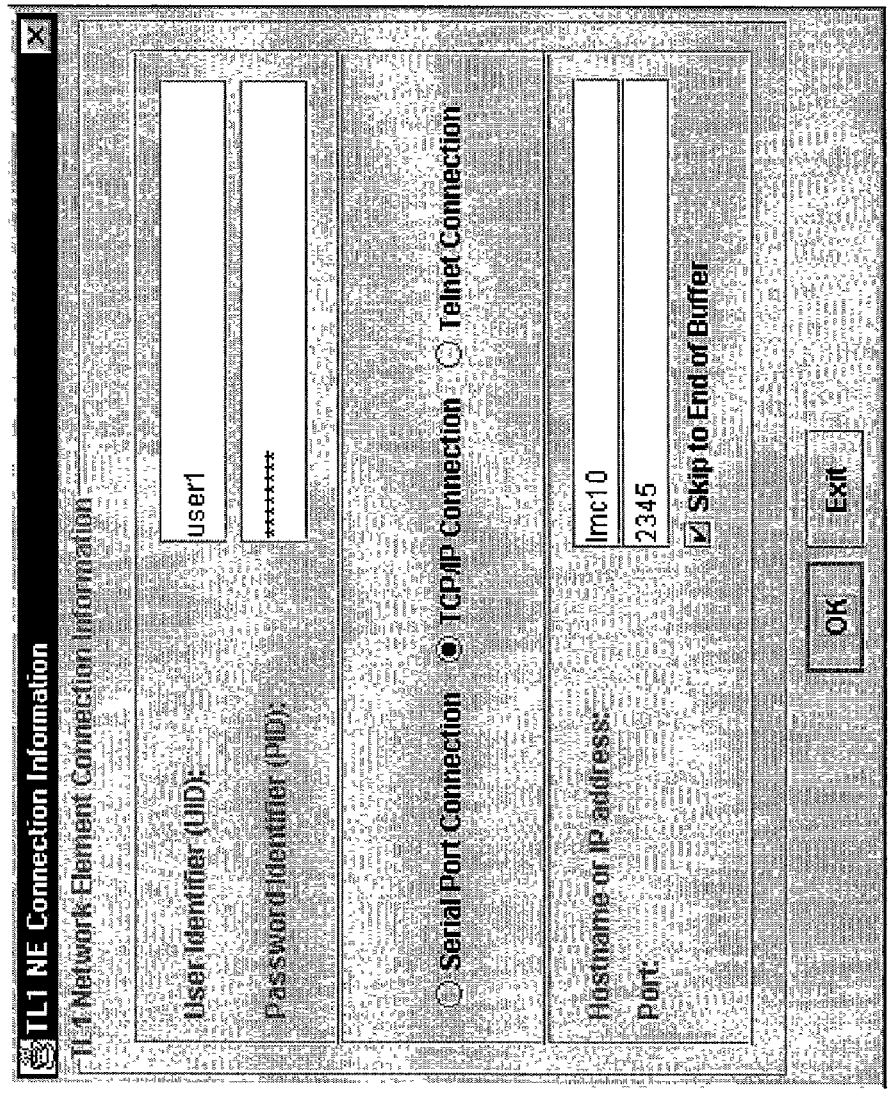
FIG. 15 illustrates an exemplary network element login dialog box.

All passwords entered on the screen may be displayed with asterisks as illustrated generally in FIG. 15 (1500). This feature can be implemented in a variety of ways within the context of an XML dialog screen definition.

A TL1 Direct Access Terminal User's Guide may describe the use of the TL1DAT.

Proprietary commands will generally not exist in any command list.

A categorized list of commands by function may be available.

An alphabetized list of commands may be available.

The TL1DAT may be run as a stand-alone application. Connections to the NE may be terminated when the application is brought down, but it is recommended that the disconnection provided on the TL1DAT be used.

The TL1DAT may include a command to disconnect the application from a NE.

The TL1DAT may be installed using an installation wizard.

The TL1DAT may be upgradeable for a new release of the application with minimal effort by the user.

The TL1DAT may allow a new NE release and/or type to be installed with minimal effort by the user.

User security may not be included within the TL1DAT. The network element's security may be used to log into the NE.

The user interface may be written using a Java 2 enhanced platform.

The TL1DAT may include access to a browser to display the HTML help pages. In a Windows® environment the default browser may be used. In a Unix® environment a Netscape browser may be used.

The TL1DAT may be supported on Solaris platforms as well as a wide variety of Microsoft® Windows® operating systems.

The TL1DAT may allow a user to switch between enhanced mode and basic mode for those NEs that allow enhanced mode.

One skilled in the art will recognize that the above specification list is sufficient to implement one exemplary embodiment of the present invention and that a wide variety of variants are possible using this design framework. This in no way limits the scope of the present invention.

Generalized NE I/O Manual Content Extension
(2300)

Figure 23:
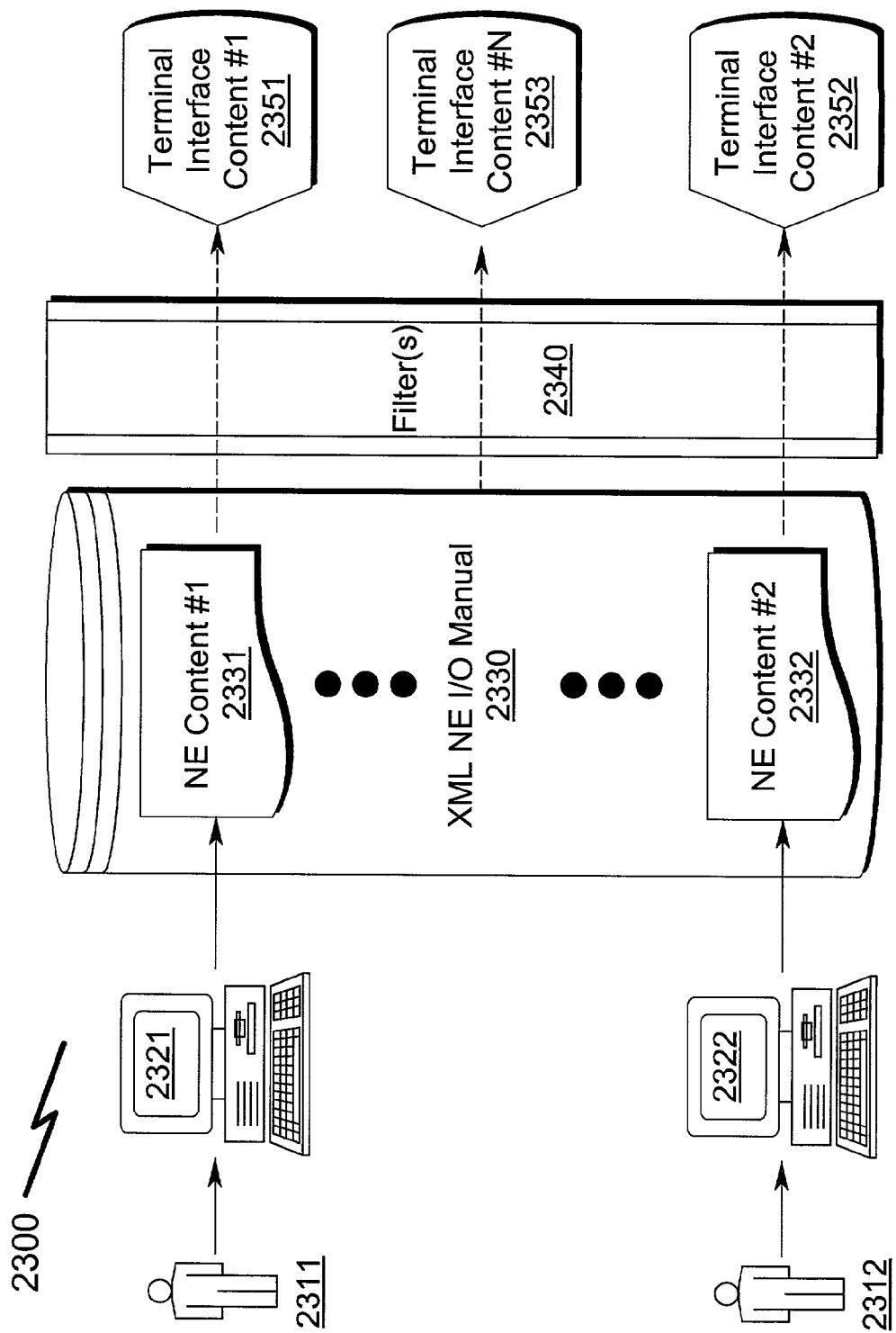
FIG. 23 illustrates an exemplary generic XML NE I/O manual providing for extension of NE content for subsequent filtering to provide terminal interface content.

As illustrated in FIG. 23 (2300), the present invention permits dynamic NE content extension by multiple users (2311, 2312) using various data editing means (2321, 2322) to create NE content (2331, 2332) within an XML NE I/O manual (2330). A given XML file (2330) can thus contain a variety of independent content describing specifics of the particular network element.

This content (2331, 2332) may then be filtered (2340) by a variety of filtering means to produce terminal interface content (2351, 2352, 2353) for use with a wide variety of network element terminal data interfaces. A significant feature of the present invention is that by integrating the network element content within the framework of an XML file, this information can be updated and augmented with other function types without the need for major software updates with respect to the terminal data interfaces.

Generalized NE I/O Manual Content Distribution (2400)

Figure 24:
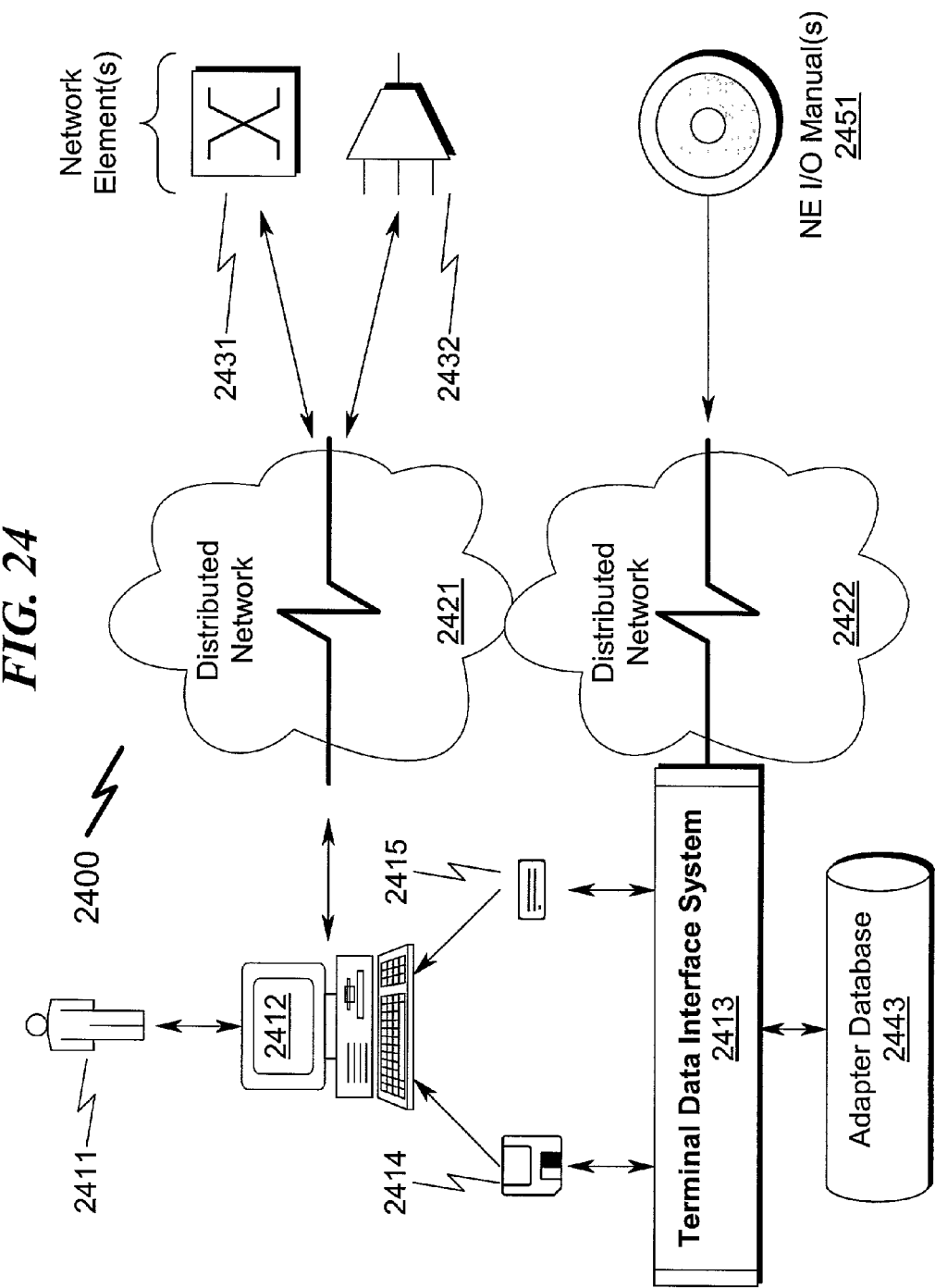
FIG. 24 illustrates an exemplary embodiment of the present invention wherein NE I/O manual content may be distributed to a terminal data interface system for automatic update using a distributed network.

As illustrated in FIG. 24 (2400), the present invention permits distribution of network element I/O manuals (2451) via a distributed network (2422) to a terminal data interface system (2413) for the dynamic creation of adapter database(s) (2443). The terminal data interface system (2413) as embodied on various computer readable media (2414, 2415) generally operates on a PC or other computer hardware (2412) in response to operator input (2411) and communicates with a variety of network elements (2431, 2432) over some distributed network (2421).

The advantage to this generalized distributed network system as compared to the prior art is that the NE I/O manuals (2451) need only be distributed via some means to the user who applies the terminal data interface system (2413) to this information to generate a dynamic adapter database (2443) that is then used to provide a fully functional operator interface available for use by the terminal data operator (2411). This methodology prevents the need for massive software distributions in the event of NE software updates and/or NE equipment upgrades/replacements. Since the system as described is data-driven, the natural procedures associated with generating on-line NE system documentation are leveraged to generate the actual software (2414, 2415) used to control the network elements (2431, 2432) by the operator (2411).

CONCLUSION

A NETWORK ELEMENT TERMINAL DATA INTERFACE (NETDI) system and method incorporating a terminal user interface which permits manipulation of network elements using a hardware-specific control language has been disclosed. The present invention teaches automatic generation of on-line help directly from I/O manual specifications and translation of operator commands into network element specific protocols via the use of a network element database and associated XML repository. Various preferred embodiments of the present invention incorporate the use of TL1 composer/parsers to permit the automatic generation of Translation Language 1 interfaces between an operator console and a wide variety of telecommunication network elements.

The present invention operates over a wide variety of communication media and permits a significant reduction of software maintenance with respect to on-line help generation directly from I/O manual specifications as well as automated incorporation of new network element features into existing operator console environmental controls, resulting in a drastic reduction in the required network element control language proficiency of network operators in any given telecommunications environment.

What is claimed is:

1. A system for facilitating the implementation by a customer of adding a particular network element to be managed by a telecommunications network element manager or of modifying the management of the particular network element already being managed by the element manager, comprising:
    a terminal data interface receiving an I/O source document specific to the particular network element, the document being converted to HTML format and provided to the customer,
        said data interface including an adapter database toolkit, wherein the toolkit responds to a command from the customer to
        extract information about Transaction Language 1 (TL1) commands from the HTML source document and
        generate from the TL1 command information an XML file to be used by an adapter database that is specific to the particular network element; and
    an operator interface, wherein the terminal data interface uses the adapter database to provide at the operator interface a command window which facilitates parameter entry for and construction of TL1 commands.

2. The system of claim 1 wherein said toolkit extracts information about TL1 commands from the HTML source document, including extracting a command function menu.

3. The system of claim 1 wherein the I/O source document converted to HTML format includes hidden tags inserted to flag specific adapter database data.

4. The system of claim 1 wherein said operator interface comprises a response window.

5. The system of claim 1 wherein said operator interface comprises a command creation panel.

6. The system of claim 4 wherein said command creation panel comprises a command code tree.

7. The system of claim 4 wherein said command creation panel comprises a command parameter panel.

8. The system of claim 7 wherein said command creation panel comprises a command string panel.

* * * * *